United States Patent

Heers et al.

[15] 3,678,389

[45] July 18, 1972

[54] METHOD AND MEANS FOR MINIMIZING THE SUBJECTIVE EFFECT OF BIT ERRORS ON PCM-ENCODED VOICE COMMUNICATION

[72] Inventors: Arthur F. Heers, San Francisco, Calif.; William G. Schmidt, Rockville, Md.

[73] Assignee: Communications Satellite Corporation

[22] Filed: Oct. 21, 1969

[21] Appl. No.: 868,145

[52] U.S. Cl. .............................325/38 R, 325/42, 329/104, 332/9, 340/347 AD, 340/347 DD

[51] Int. Cl. .............................H04b 1/00

[58] Field of Search .................340/347 DD, 146.1, 347 AD; 325/38, 38 A, 38 B, 41, 141, 323, 42, 324; 179/1 SA, 15 SS, 18 TR, 15 AE, 15 AP, 15 AV; 178/26, 67–68; 332/9, 11; 329/104

[56] References Cited

UNITED STATES PATENTS

| | | | |
|---|---|---|---|
| 3,151,296 | 9/1964 | Phyfe | 179/15 AE |
| 3,383,655 | 5/1968 | McRae | 325/41 |
| 3,317,720 | 5/1967 | Lender | 325/38 A |
| 3,504,112 | 3/1970 | Gruenberg | 325/38 |
| 3,518,662 | 6/1970 | Nakagome et al. | 328/38 A |

OTHER PUBLICATIONS

I. Dostis, The Effects of Digital Errors on PCM, Bell Systems Jour., Dec. 1965, pp. 2227–2243.

*Primary Examiner*—Albert J. Mayer
*Attorney*—Sughrue, Rothwell, Mion, Zinn & Macpeak

[57] ABSTRACT

This disclosure concerns a method and a means for minimizing the subjective effect of bit errors on PCM-encoded voice communication. The input signal is assumed to be Laplace distributed with the words in the middle of the code occurring most often. A new code is formulated so that a single bit error in the mid ranges changes the sample level to a minimum degree. In the specific example presented, a seven-bit code having 128 sample levels is employed, with the 63rd and 64th levels bracketing the midpoint. The code word 0000000 is arbitrarily assigned to the 63rd level, and one of its nearest neighbors (words differing from it by a single bit) 1000000, is assigned to the 64th level. The six remaining or unassigned nearest neighbors of 0000000 are then assigned to levels 57 to 62, while the six other nearest neighbors of 1000000 are assigned to levels 65 to 70. Thereafter, the unassigned nearest neighbors of the level 62 word, 0000001, are assigned to levels 52 to 56, and so on, until the entire code word pattern is completed. Because of the manner in which the code, which has as yet no recognized name, is generated, it is designated in the disclosure as the "nearest-neighbor-rule" or simply "NNR" code. In order to facilitate the interface with existing PCM communication equipment, the straight binary code coming out of the PCM encoder is converted to the folded binary code, and the folded binary code is then converted to the NNR code. This code is transmitted through a receiving station via any suitable communications link and there decoded by the reverse process, i.e., NNR code to folded binary code to straight binary code and thence to message signal samples. There is no obvious relationship between the binary codes and the NNR code. For a seven-bit code, there are 128 possible combinations; however, the symmetrical properties of the folded binary code reduces the encoding and decoding problem to 32 possible combinations. Conversion between the straight binary code and the folded binary code may be performed serially or in parallel. Conversion between the folded binary code and the NNR code is accomplished by a decoding matrix which selectively reads the contents of one of 32 storage registers.

13 Claims, 14 Drawing Figures

FIG. I PROBABILITY DENSITY FUNCTIONS OF WORD OCCURRENCE
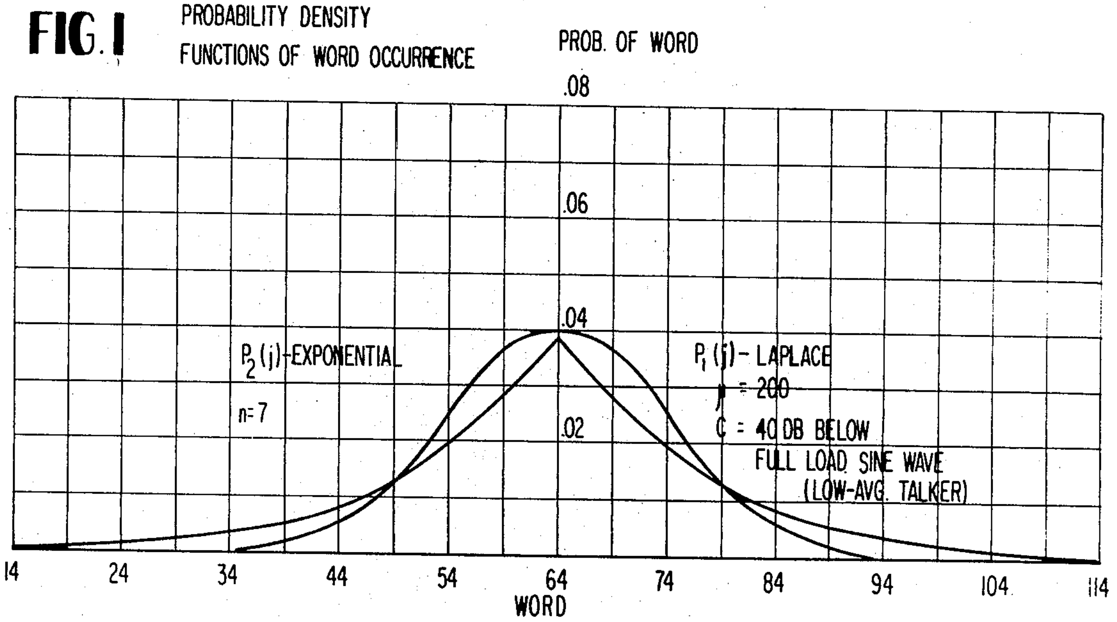
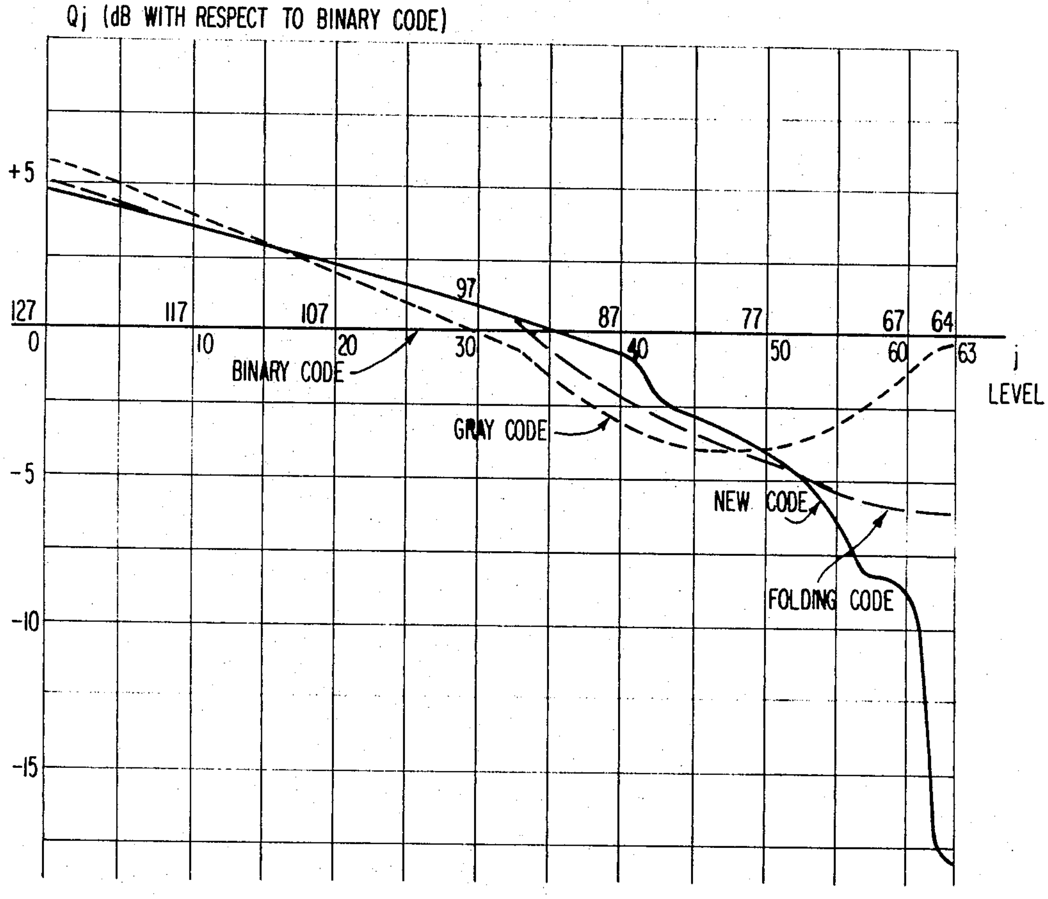
FIG.2 COMPARISON OF Qj (ERROR) OF 7-BIT CODES - DB BELOW Qj FOR BINARY CODE
INVENTORS, A. F. HEERS
WILLIAM G. SCHMIDT
BY
Sughrue, Rothwell, Mion, Zinn & Macpeak
ATTORNEYS

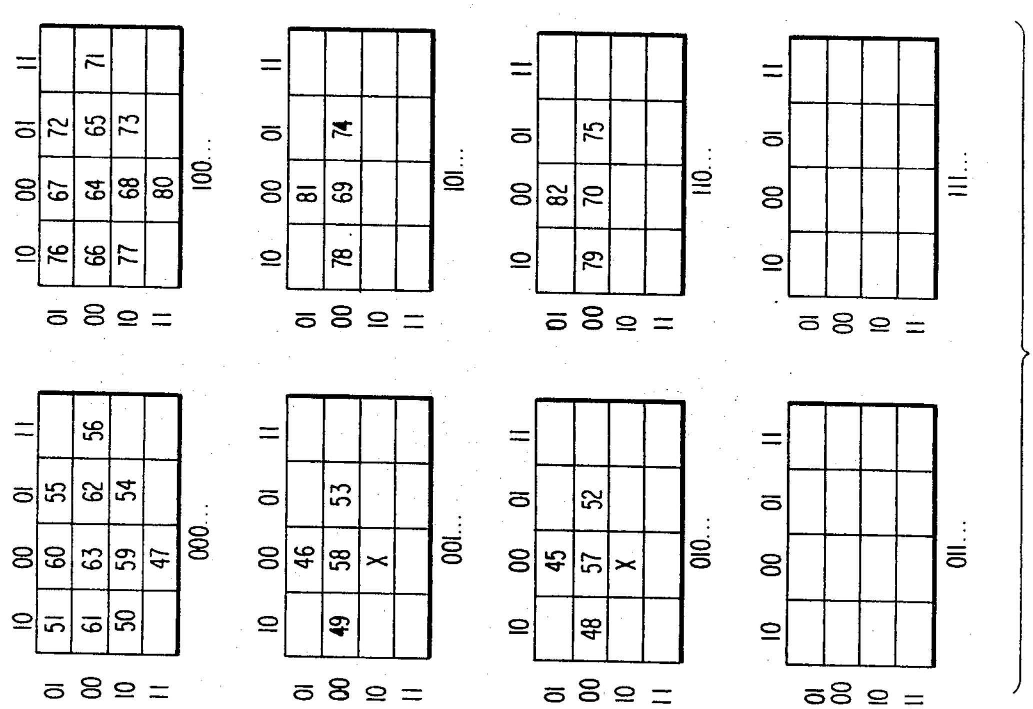
FIG. 3b PARTIALLY COMPLETED MAP OF NEW CODE
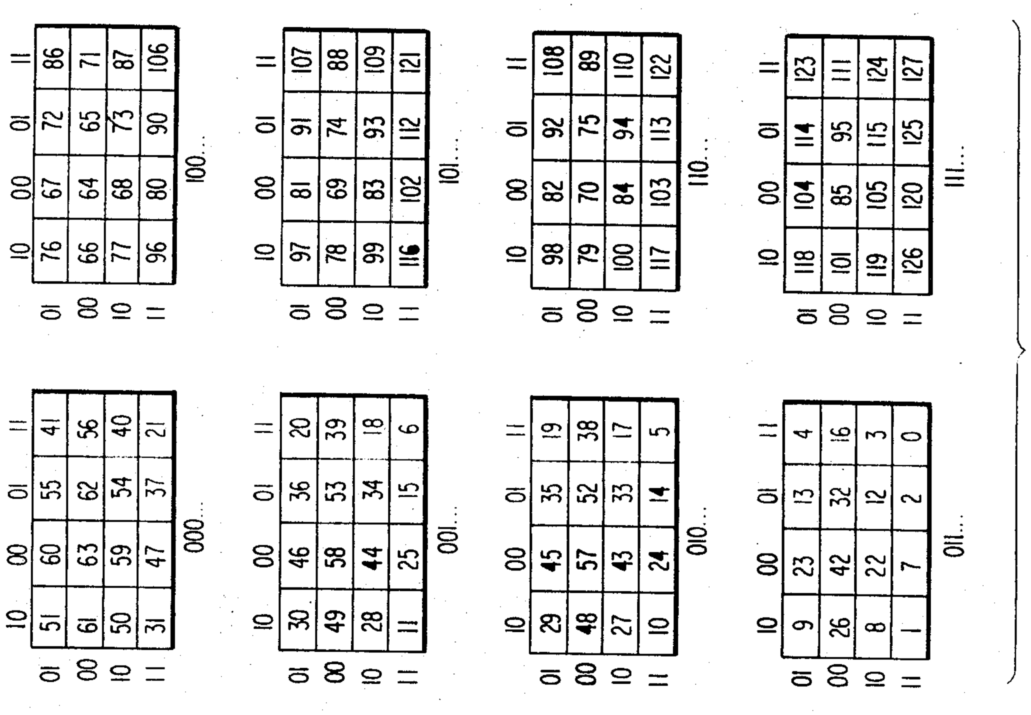
FIG. 3a MAP OF NEW CODE

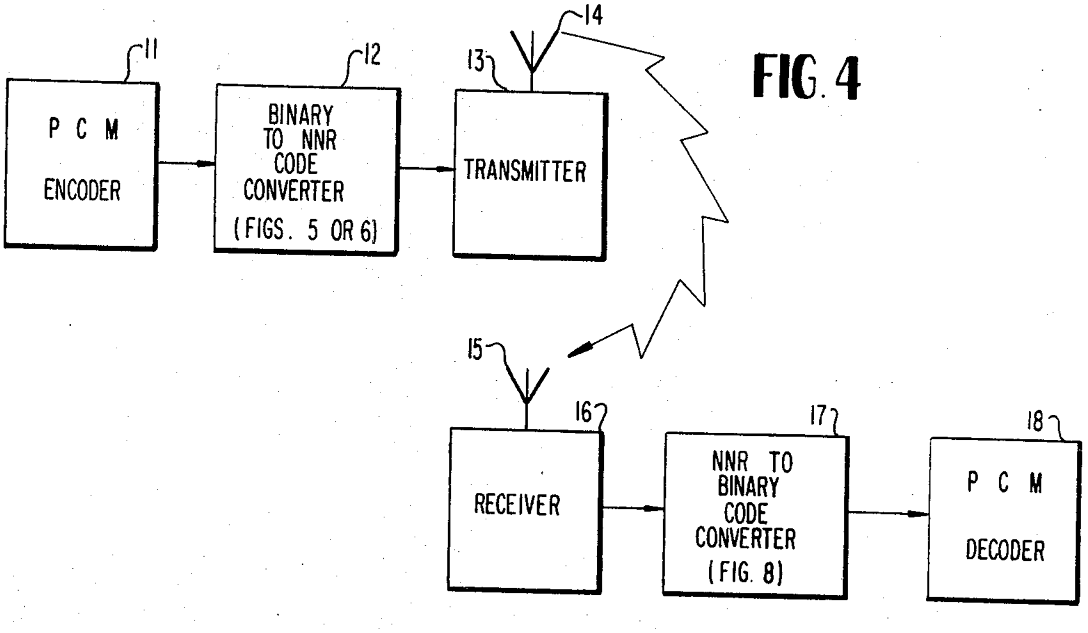
FIG. 4
FIG. 7 SERIAL APPROACH TIMING PROGRAM
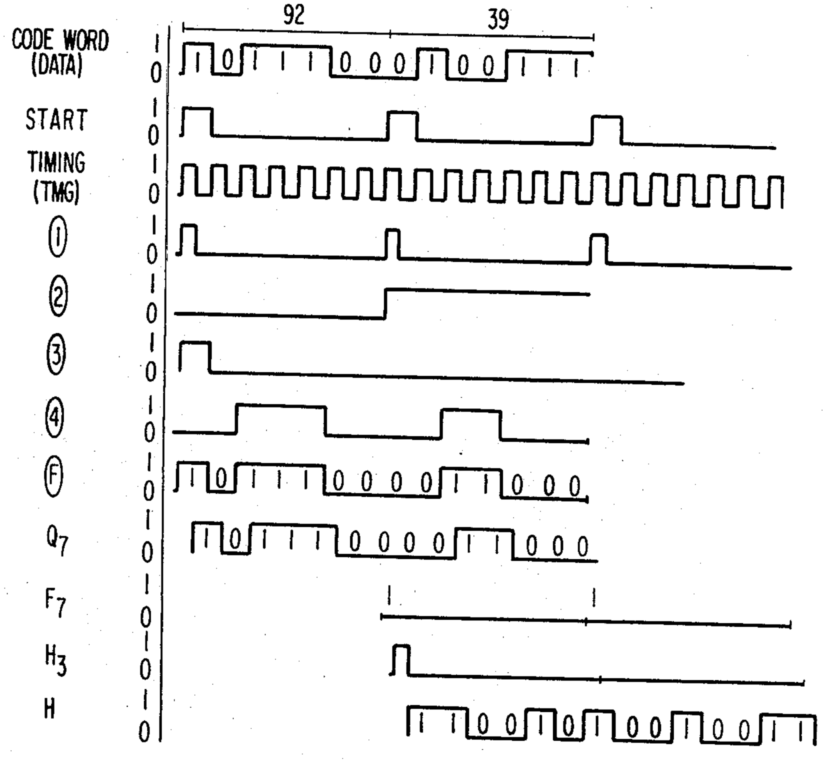

FIG. 5 PARALLEL TWO - STAGE ENCODER
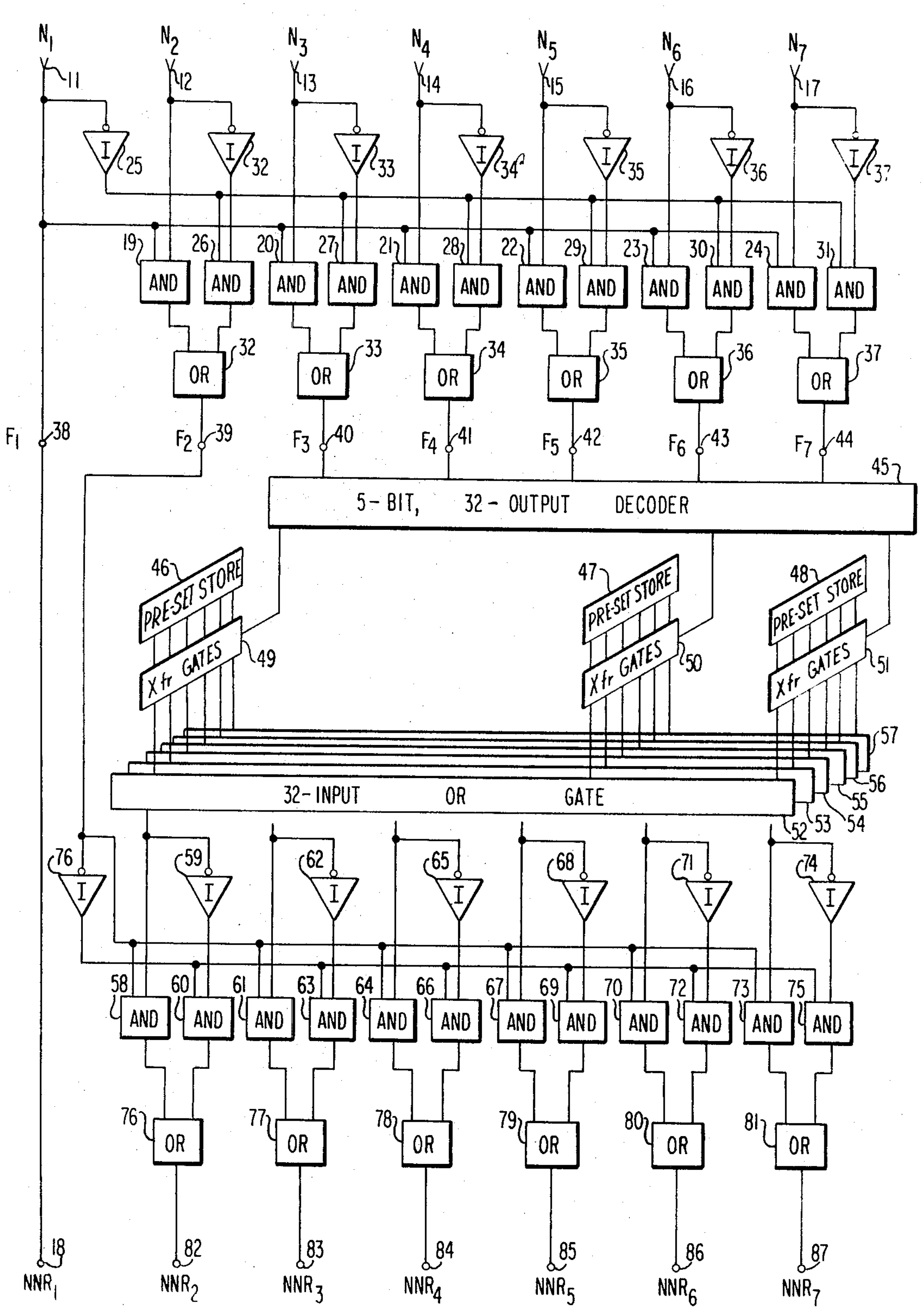

FIG. 6 SERIAL TWO-STAGE ENCODER
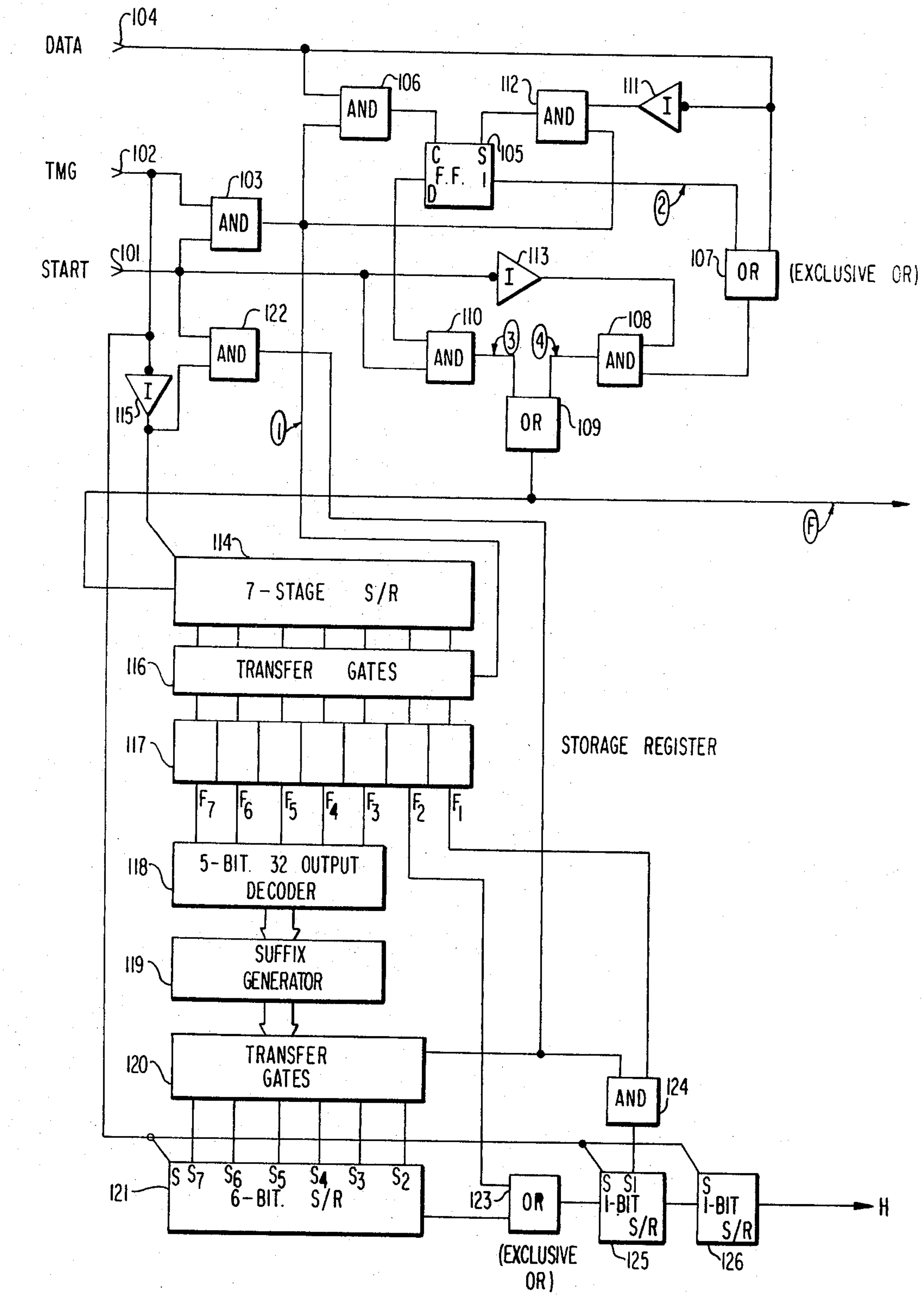

NNR-FOLDING-BINARY CODE CONVERSION.

METHOD AND MEANS FOR MINIMIZING THE SUBJECTIVE EFFECT OF BIT ERRORS ON PCM-ENCODED VOICE COMMUNICATION

BACKGROUND OF THE INVENTION

1. Field of the Invention

This invention relates to PCM communication, and more particularly to a method and means of reducing the subjective effect of single bit errors on PCM-encoded voice communication.

2. Description of the Prior Art

One of the most significant trends in modern communications is the rapidly increasing utilization of digitally encoded voice channels in commercial and military communications. In a PCM-encoded voice communication system, the instantaneous amplitudes of the voice signal to be transmitted are periodically sampled, and each sampled amplitude level is encoded as a group of pulses. These pulses may be on-or-off pulses, phase modulated pulses, or the like. It is conventional that the encoded pulses be in the form of a binary code. The encoded pulse groups may be used to modulate a carrier which is then transmitted over a suitable communications link such as a transmission line or microwave link to a receiver.

The major advantage of PCM communications is the fact that it permits complete noise-free regeneration of the signal at each repeater, unlike the more conventional repeaters which amplify the incoming signal pulse noise and also adds a certain amount of repeater noise of its own. Eventually the accrued additive noise limits the quality of the voice signal in linearly repeatered links. In PCM repeatered links noise must exceed a rather high threshold before it influences the value of a bit. While the probability of noise producing a false bit is generally small, a single bit error in a code group can produce a crack or pop in the output voice signal, depending upon which bit of the code group is "hit."

Summary of the Invention It is therefore an object of the present invention to reduce the subjective effect of single bit errors on PCM-encoded voice communication.

It is another object of this invention to provide a PCM communication system which utilizes a new code that minimizes the voltage levels jumped if an error occurs in one of the bits of code words corresponding to the middle amplitude sampling levels.

According to the present invention, the foregoing and other objects are attained by providing an optimum code that minimizes the subjective effect of hearing the errors that occur in the received code words in a PCM-encoded voice communications system. The invention is predicted on four basic assumptions which are:

1. A bit error that causes a large error in the voltage level at the output of the decoder is worse than one that causes a smaller error.

2. The input signal is Laplace distributed, that is, the words in the middle of the code occur most often. 3. An error occuring when someone is talking softly, or when there is no one talking (that is, when the voltage level is low and therefore when only the middle code words are being transmitted) is more annoying than when the same error occurs during loud talking. 4. At most, one bit in any given word will be an error.

Tests have proved the first assumption is definitely valid. When no one is talking, errors in the new code cause a voltage level jump of, at most, 6/64 of 0-peak full-load sine wave for a seven-bit code, while errors in the binary code can cause error as great as 100percent of 0-peak full-load sine wave (when the most significant bit is in error). The difference at the receiver is definitely noticeable, the larger voltage level errors yielding significantly louder cracks or pops than the smaller voltage level errors.

The second assumption has been established by several people concerned with encoded voice communication. See, for example, the article by I. Dostis entitled "The Effects of Digital Errors in PCM Transmission of Compandered Speech," The bell System Technical Journal, pages 2227 to 2243, December 1965. This leads one to believe that the effect of errors in the middle words of a code should be minimized.

The third assumption has been verified by subjective tests of the new code which minimizes the static at very low talking levels. At the higher voice levels, the listener's ear tends to concentrate on the talking and partially ignore the static.

The fourth assumption is valid when the error range is low enough and when a method of transmission is used wherein the probability of an error occuring in any one bit is independent of an error occuring in any other bit. If this is not the case, but if one knows the exact nature of the dependence (for example, if one error causes necessarily an error in the succeeding bit, as is the case with differential PSK encoding), then the code can be modified using the principles to be described hereinafter.

In the specific examples presented, a seven-bit code having 128 sample levels is employed; however, the code can be extended to other and higher bit codes with resulting relatively better increases in performance. With the seven-bit code, the 63rd and 64th levels bracket the midpoint of the sampling levels. The code word 0000000 is arbitrarily assigned to the 63rd level and one of its nearest neighbors, 1000000, is assigned to the 64th level. The six remaining or unassigned nearest neighbors of 00000000 are then assigned to the levels 57 to 62, while the six other nearest neighbors of 1000000 are assigned to levels 65 to 70. Thereafter, the unassigned nearest neighbors of level 62 word, 00000001, are assigned to levels 52 to 56, and so on, until the entire code word pattern is completed. The resulting code is designated the "nearest-neighbor-rule" or simply "NNR" code.

In the specific embodiments disclosed, the straight binary code coming out of an conventional PCM encoder is converted to the folded binary code, and the folded binary code is then converted to the NNR code. This facilitates the interface with existing PCM communication equipments. Obviously, there may be situations in which it is desirable to encode the sampled amplitude levels directly in the NNR code. The code is then transmitted to a receiving station via any suitable communications link and is there decoded by the reverse process.

Brief Description of the Drawing

The specific nature of the invention, as well as other objects, aspects, uses and advantages thereof, will clearly appear from the following description and from the accompanying drawing, in which:

FIG. 1 is a curve illustrating the probability density functions of word occurrence.

FIG. 2 is a graph showing the comparison of the figures of merit of several seven-bit codes.

FIG. 3*a* is a topographical map of the NNR code.

FIG. 3*b* is a partially completed topographical map of the NNR code illustrating the manner in which the code is generated.

FIG. 4 is a simplified block diagram of a communication system employing the principles of the present invention.

FIG. 5 is a block and logical diagram of a parallel, 2-stage encoder for encoding voice signal samples into NNR code groups.

FIG. 6 is a block and logical diagram of an alternate serial, two-stage encoder.

FIG. 7 is a timing diagram for the serial encoder shown in FIG. 5.

DESCRIPTION OF THE PREFERRED EMBODIMENTS

Figure 8:
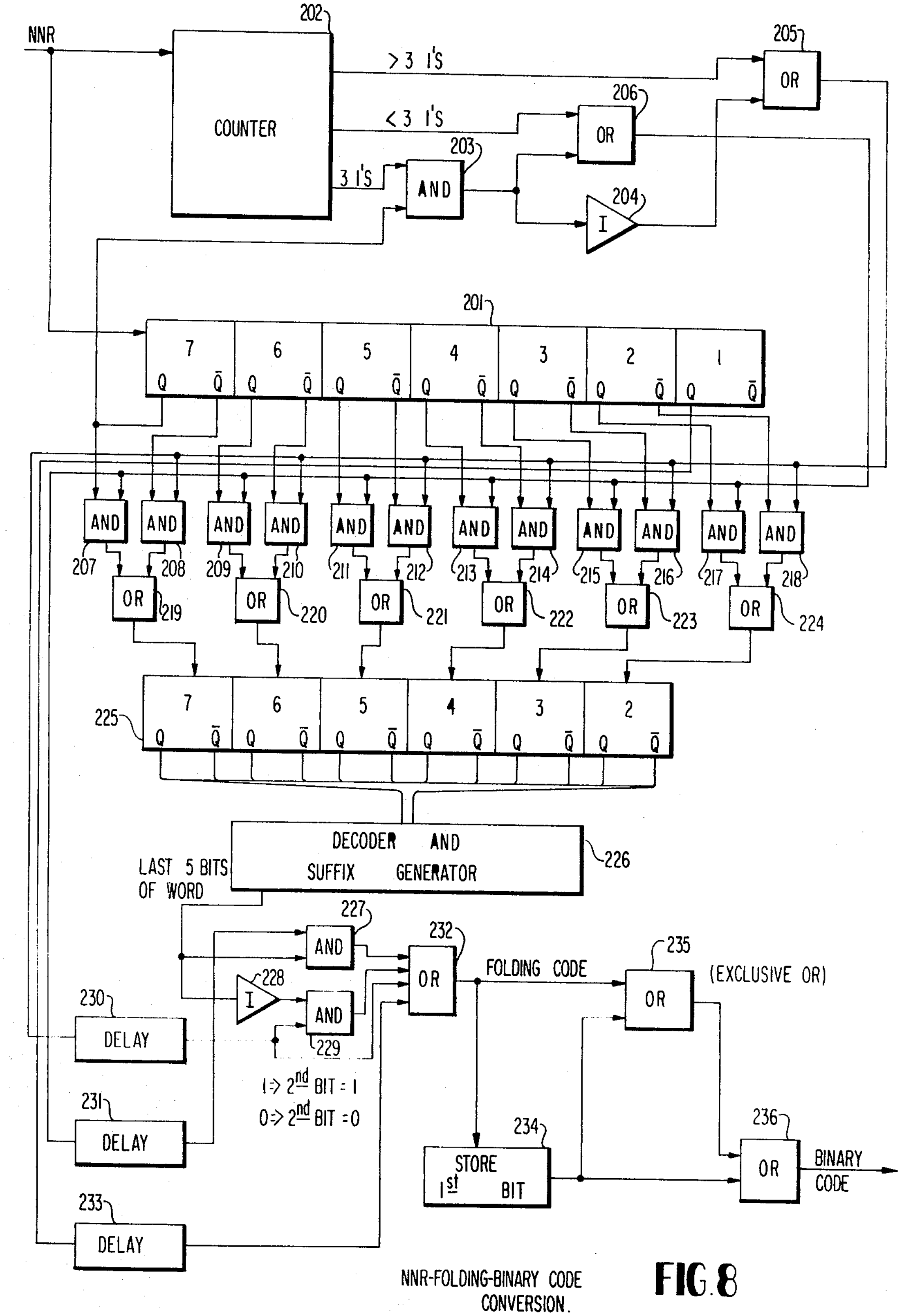
FIG. 8 is a block and logical diagram of a decoder for decoding the NNR code to a straight binary code.

A theoretical comparison of different codes may be made by weighing the effect of an error in each word by the probability that the word will occur. In the article by Dostis cited above, there is presented a theoretical study of the use of three different codes for voice communication: the binary, folding, and Gray codes. Dostis has derived an approximate expression for the probability of each word occuring assuming that speech is Laplace distributed:

$$P(j)=\frac{C\log(1+\mu)}{2^{n-1}\mu}(1+\mu)^{\left[\frac{-1-2j}{2^n}+1\right]}\exp\left\{\frac{2C}{\mu}(1+\mu)^{\left[\frac{-1-2j}{2^n}+1\right]}-1\right\} \quad (1)$$

where $n$ = the number of bits per word; $j=0, 1, 2 \ldots 2^{n-1}$, and indicates the word whose probability is being computed; $C$ = RMS Value Full Load Sine Wave/RMS Value Signal and indicates the loudness of talking; and $\mu$ = the logarithmic compression ratio.

For the purposes of the subject invention, the probability of the $j$th word occurring is given by an exponential function whose time constant is picked such that the density function falls off at about the same rate as $P_1(j)$ when low-to average-level talkers are used and the logarithmic compression ratio is 200. This density function is:

$$P_2(j)=N\,e^{5\left(\frac{2j+1}{2^n}-1\right)}$$

for $j=0, 1 \ldots 63$ and $$P_2(j)=N\,e^{-5\left(\frac{2j+1}{2^n}-1\right)}$$

for $j=64, 65 \ldots 127$ where (2)

$$N=\sum_{j=0}^{63}e^{5\left(\frac{2j+1}{2^n}-1\right)}+\sum_{j=64}^{127}e^{-5\left(\frac{2j+1}{2^n}-1\right)}$$

FIG. 1 shows a comparison of (1) and (2), with $C$ = 30 dB and $\mu$ = 200.

The effect of errors is given by a figure of merit $Q_j$, given by $$Q_j=\sum_{i=1}^{n}\Delta ij \quad (3)$$

$j=0, 1 \ldots 2^n$ where $\Delta_{ij}$ = The number of voltage levels jumped when an error is made in the $i$th bit of the $j$th word.

For instance, in a seven-bit code, using the binary code, $$Q_j=(64)^2+(32)^2+(16)^2+(8)^2+(4)^2+(2)^2+(1)^2=5461,\text{ for all } j.$$

The reason for defining $Q_j$ as the sum of the squares of the voltage levels jumped is to take into account the fact that the larger voltage level jumps (sounding as loud snaps) are subjectively more annoying than softer clicks at lower voltage level jumps.

Combining equations (1) and (3), $Q_c$ is defined as:

$$Q_c=\sum_{J=0}^{2n-1}P(j)Q_j$$

where $Q_c$ is a measure of the noise in the code.

Using the criteria for comparison described above and assuming a seven-bit code, Table 1 gives the $Q_j$'s of the straight binary, folding binary, Gray, and the NNR codes, while FIG. 2 compares the Figures of merit $Q_j$.

TABLE 1.—COMPARISON OF ERROR OF 7-BIT CODES

| | Binary Code | | | | | | | | Folding binary code | | | | | | | | Gray code | | | | | | | | New code | | | | | | | |
|---|---|---|---|---|---|---|---|---|---|---|---|---|---|---|---|---|---|---|---|---|---|---|---|---|---|---|---|---|---|---|---|---|
| | Error | | | | | | | | Error | | | | | | | | Error | | | | | | | | Error | | | | | | | |
| Level | $\Delta_{i,j}$ | | | | | | | $Q_j$ | $\Delta_{i,j}$ | | | | | | | $Q_j$ | $\Delta_{i,j}$ | | | | | | | $Q_j$ | $\Delta_{i,j}$ | | | | | | | $Q_j$ |
| 63 | 64 | 32 | 16 | 8 | 4 | 2 | 1 | 5461 | 1 | 32 | 16 | 8 | 4 | 2 | 1 | 1366 | 1 | 63 | 31 | 15 | 7 | 3 | 1 | 5215 | 1 | 6 | 5 | 4 | 3 | 2 | 1 | 92 |
| 62 | 64 | 32 | 16 | 8 | 4 | 2 | 1 | 5461 | 3 | 32 | 16 | 8 | 4 | 2 | 1 | 1374 | 3 | 61 | 29 | 13 | 5 | 1 | 1 | 4767 | 3 | 10 | 9 | 8 | 7 | 6 | 1 | 340 |
| 61 | 64 | 32 | 16 | 8 | 4 | 2 | 1 | 5461 | 5 | 32 | 16 | 8 | 4 | 2 | 1 | 1390 | 5 | 59 | 27 | 11 | 3 | 1 | 1 | 4448 | 5 | 13 | 12 | 11 | 10 | 2 | 5 | 588 |
| 60 | 64 | 32 | 16 | 8 | 4 | 2 | 1 | 5461 | 7 | 32 | 16 | 8 | 4 | 2 | 1 | 1414 | 7 | 57 | 25 | 9 | 1 | 3 | 1 | 4015 | 7 | 15 | 14 | 13 | 3 | 9 | 5 | 754 |
| 59 | 64 | 32 | 16 | 8 | 4 | 2 | 1 | 5461 | 9 | 32 | 16 | 8 | 4 | 2 | 1 | 1446 | 9 | 55 | 23 | 7 | 1 | 3 | 1 | 3695 | 9 | 16 | 15 | 14 | 12 | 9 | 5 | 828 |
| 58 | 64 | 32 | 16 | 8 | 4 | 2 | 1 | 5461 | 11 | 32 | 16 | 8 | 4 | 2 | 1 | 1486 | 11 | 53 | 21 | 5 | 3 | 1 | 1 | 3407 | 11 | 16 | 5 | 14 | 12 | 9 | 5 | 848 |
| 57 | 64 | 32 | 16 | 8 | 4 | 2 | 1 | 5461 | 13 | 32 | 16 | 8 | 4 | 2 | 1 | 1534 | 13 | 51 | 19 | 3 | 5 | 1 | 1 | 3167 | 13 | 6 | 15 | 14 | 12 | 9 | 5 | 876 |
| 56 | 64 | 32 | 16 | 8 | 4 | 2 | 1 | 5461 | 15 | 32 | 16 | 8 | 4 | 2 | 1 | 1590 | 15 | 49 | 17 | 1 | 7 | 3 | 1 | 2975 | 15 | 18 | 17 | 16 | 15 | 6 | 5 | 1380 |
| 55 | 64 | 32 | 16 | 8 | 4 | 2 | 1 | 5461 | 17 | 32 | 16 | 8 | 4 | 2 | 1 | 1654 | 17 | 47 | 15 | 1 | 7 | 3 | 1 | 2783 | 17 | 20 | 19 | 18 | 7 | 14 | 5 | 1704 |
| 54 | 64 | 32 | 16 | 8 | 4 | 2 | 1 | 5461 | 19 | 32 | 16 | 8 | 4 | 2 | 1 | 1726 | 19 | 45 | 13 | 3 | 5 | 1 | 1 | 2591 | 19 | 21 | 20 | 8 | 17 | 14 | 5 | 1836 |
| 53 | 64 | 32 | 16 | 8 | 4 | 2 | 1 | 5461 | 21 | 32 | 16 | 8 | 4 | 2 | 1 | 1806 | 21 | 43 | 11 | 5 | 3 | 1 | 1 | 2447 | 21 | 21 | 9 | 19 | 17 | 14 | 5 | 1894 |
| 52 | 64 | 32 | 16 | 8 | 4 | 2 | 1 | 5461 | 23 | 32 | 16 | 8 | 4 | 2 | 1 | 1894 | 23 | 41 | 9 | 7 | 1 | 3 | 1 | 2351 | 23 | 10 | 20 | 19 | 17 | 14 | 5 | 1960 |
| 51 | 64 | 32 | 16 | 8 | 4 | 2 | 1 | 5461 | 25 | 32 | 16 | 8 | 4 | 2 | 1 | 1990 | 25 | 39 | 7 | 9 | 1 | 3 | 1 | 2287 | 25 | 22 | 21 | 20 | 10 | 9 | 10 | 2141 |
| 50 | 64 | 32 | 16 | 8 | 4 | 2 | 1 | 5461 | 27 | 32 | 16 | 8 | 4 | 2 | 1 | 2094 | 27 | 37 | 5 | 11 | 3 | 1 | 1 | 2255 | 27 | 23 | 22 | 11 | 19 | 9 | 10 | 2405 |
| 49 | 64 | 32 | 16 | 8 | 4 | 2 | 1 | 5461 | 29 | 32 | 16 | 8 | 4 | 2 | 1 | 2206 | 29 | 35 | 3 | 13 | 5 | 1 | 1 | 2271 | 29 | 23 | 12 | 21 | 19 | 9 | 10 | 2496 |
| 48 | 64 | 32 | 16 | 8 | 4 | 2 | 1 | 5461 | 31 | 32 | 16 | 8 | 4 | 2 | 1 | 2326 | 31 | 33 | 1 | 15 | 7 | 3 | 1 | 2335 | 31 | 13 | 22 | 21 | 19 | 9 | 10 | 2597 |
| 47 | 64 | 32 | 16 | 8 | 4 | 2 | 1 | 5461 | 33 | 32 | 16 | 8 | 4 | 2 | 1 | 2454 | 33 | 31 | 1 | 15 | 7 | 3 | 1 | 2335 | 33 | 23 | 22 | 13 | 12 | 16 | 10 | 2771 |
| 46 | 64 | 32 | 16 | 8 | 4 | 2 | 1 | 5461 | 35 | 32 | 16 | 8 | 4 | 2 | 1 | 2590 | 35 | 29 | 3 | 13 | 5 | 1 | 1 | 2271 | 35 | 23 | 14 | 21 | 12 | 16 | 10 | 2891 |
| 45 | 64 | 32 | 16 | 8 | 4 | 2 | 1 | 5461 | 37 | 32 | 16 | 8 | 4 | 2 | 1 | 2734 | 37 | 27 | 5 | 11 | 3 | 1 | 1 | 2255 | 37 | 15 | 22 | 21 | 12 | 16 | 10 | 3019 |
| 44 | 64 | 32 | 16 | 8 | 4 | 2 | 1 | 5461 | 39 | 32 | 16 | 8 | 4 | 2 | 1 | 2886 | 39 | 25 | 7 | 9 | 1 | 3 | 1 | 2287 | 39 | 22 | 15 | 14 | 19 | 16 | 10 | 3143 |
| 43 | 64 | 32 | 16 | 8 | 4 | 2 | 1 | 5461 | 41 | 32 | 16 | 8 | 4 | 2 | 1 | 3046 | 41 | 23 | 9 | 7 | 1 | 3 | 1 | 2351 | 41 | 16 | 21 | 14 | 19 | 16 | 10 | 3291 |
| 42 | 64 | 32 | 16 | 8 | 4 | 2 | 1 | 5461 | 43 | 32 | 16 | 8 | 4 | 2 | 1 | 3214 | 43 | 21 | 11 | 5 | 3 | 1 | 1 | 2447 | 43 | 16 | 15 | 20 | 19 | 16 | 10 | 3447 |
| 41 | 64 | 32 | 16 | 8 | 4 | 2 | 1 | 5461 | 45 | 32 | 16 | 8 | 4 | 2 | 1 | 3390 | 45 | 19 | 13 | 3 | 5 | 1 | 1 | 2591 | 45 | 22 | 21 | 20 | 15 | 14 | 10 | 3871 |
| 40 | 64 | 32 | 16 | 8 | 4 | 2 | 1 | 5461 | 47 | 32 | 16 | 8 | 4 | 2 | 1 | 3574 | 47 | 17 | 15 | 1 | 7 | 3 | 1 | 2783 | 47 | 23 | 22 | 16 | 19 | 14 | 10 | 4135 |
| 39 | 64 | 32 | 16 | 8 | 4 | 2 | 1 | 5461 | 49 | 32 | 16 | 8 | 4 | 2 | 1 | 3766 | 49 | 15 | 17 | 1 | 7 | 3 | 1 | 2975 | 49 | 23 | 17 | 21 | 19 | 14 | 10 | 4317 |
| 38 | 46 | 32 | 16 | 8 | 4 | 2 | 1 | 5461 | 51 | 32 | 16 | 8 | 4 | 2 | 1 | 3966 | 51 | 13 | 19 | 3 | 5 | 1 | 1 | 3167 | 51 | 18 | 22 | 21 | 19 | 14 | 10 | 4507 |
| 37 | 64 | 32 | 16 | 8 | 4 | 2 | 1 | 5461 | 53 | 32 | 16 | 8 | 4 | 2 | 1 | 4174 | 53 | 11 | 21 | 5 | 3 | 1 | 1 | 3407 | 53 | 23 | 22 | 18 | 17 | 16 | 10 | 4791 |
| 36 | 64 | 32 | 16 | 8 | 4 | 2 | 1 | 5461 | 55 | 32 | 16 | 8 | 4 | 2 | 1 | 4390 | 55 | 9 | 23 | 7 | 1 | 3 | 1 | 3695 | 55 | 23 | 19 | 21 | 17 | 16 | 10 | 5001 |
| 35 | 64 | 32 | 16 | 8 | 4 | 2 | 1 | 5461 | 57 | 32 | 16 | 8 | 4 | 2 | 1 | 4614 | 57 | 7 | 25 | 9 | 1 | 3 | 1 | 4015 | 57 | 20 | 22 | 21 | 17 | 16 | 10 | 5219 |
| 34 | 64 | 32 | 16 | 8 | 4 | 2 | 1 | 5461 | 59 | 32 | 16 | 8 | 4 | 2 | 1 | 4846 | 59 | 5 | 27 | 11 | 3 | 1 | 1 | 4448 | 59 | 22 | 20 | 19 | 19 | 16 | 10 | 5443 |
| 33 | 64 | 32 | 16 | 8 | 4 | 2 | 1 | 5461 | 61 | 32 | 16 | 8 | 4 | 2 | 1 | 5086 | 61 | 3 | 29 | 13 | 5 | 1 | 1 | 4767 | 61 | 21 | 21 | 19 | 19 | 16 | 10 | 5681 |
| 32 | 64 | 32 | 16 | 8 | 4 | 2 | 1 | 5461 | 63 | 32 | 16 | 8 | 4 | 2 | 1 | 5334 | 63 | 1 | 31 | 15 | 7 | 3 | 1 | 5215 | 63 | 21 | 20 | 20 | 19 | 16 | 10 | 5927 |
| 31 | 64 | 32 | 16 | 8 | 4 | 2 | 1 | 5461 | 65 | 32 | 16 | 8 | 4 | 2 | 1 | 5590 | 65 | 1 | 31 | 15 | 7 | 3 | 1 | 5471 | 65 | 21 | 20 | 20 | 19 | 16 | 10 | 6183 |
| 30 | 64 | 32 | 16 | 8 | 4 | 2 | 1 | 5461 | 67 | 32 | 16 | 8 | 4 | 2 | 1 | 5854 | 67 | 3 | 29 | 13 | 5 | 1 | 1 | 5534 | 67 | 21 | 21 | 19 | 19 | 16 | 10 | 6449 |
| 29 | 64 | 32 | 16 | 8 | 4 | 2 | 1 | 5461 | 69 | 32 | 16 | 8 | 4 | 2 | 1 | 6125 | 69 | 5 | 27 | 11 | 3 | 1 | 1 | 5646 | 69 | 22 | 20 | 19 | 19 | 16 | 10 | 6723 |
| 28 | 64 | 32 | 16 | 8 | 4 | 2 | 1 | 5461 | 71 | 32 | 16 | 8 | 4 | 2 | 1 | 6406 | 71 | 7 | 25 | 9 | 1 | 3 | 1 | 5807 | 71 | 20 | 22 | 21 | 17 | 16 | 10 | 7011 |
| 27 | 64 | 32 | 16 | 8 | 4 | 2 | 1 | 5461 | 73 | 32 | 16 | 8 | 4 | 2 | 1 | 6694 | 73 | 9 | 23 | 7 | 1 | 3 | 1 | 5999 | 73 | 23 | 19 | 21 | 17 | 16 | 10 | 7305 |
| 26 | 64 | 32 | 16 | 8 | 4 | 2 | 1 | 5461 | 75 | 32 | 16 | 8 | 4 | 2 | 1 | 7000 | 75 | 11 | 21 | 5 | 3 | 1 | 1 | 6223 | 75 | 23 | 22 | 18 | 17 | 16 | 10 | 7607 |
| 25 | 64 | 32 | 16 | 8 | 4 | 2 | 1 | 5461 | 77 | 32 | 16 | 8 | 4 | 2 | 1 | 7280 | 77 | 13 | 19 | 3 | 5 | 1 | 1 | 6495 | 77 | 18 | 22 | 21 | 19 | 14 | 10 | 7835 |
| 24 | 64 | 32 | 16 | 8 | 4 | 2 | 1 | 5461 | 79 | 32 | 16 | 8 | 4 | 2 | 1 | 7600 | 79 | 16 | 17 | 1 | 7 | 4 | 1 | 6815 | 79 | 23 | 17 | 21 | 19 | 14 | 10 | 8157 |
| 23 | 64 | 32 | 16 | 8 | 4 | 2 | 1 | 5461 | 81 | 32 | 16 | 8 | 4 | 2 | 1 | 7926 | 81 | 17 | 15 | 1 | 7 | 3 | 1 | 7135 | 81 | 23 | 22 | 16 | 19 | 14 | 10 | 8407 |
| 22 | 64 | 32 | 16 | 8 | 4 | 2 | 1 | 5461 | 83 | 32 | 16 | 8 | 4 | 2 | 1 | 8254 | 83 | 19 | 13 | 3 | 5 | 1 | 1 | 7455 | 83 | 22 | 21 | 20 | 15 | 14 | 10 | 8735 |
| 21 | 64 | 32 | 16 | 8 | 4 | 2 | 1 | 5461 | 85 | 32 | 16 | 8 | 4 | 2 | 1 | 8590 | 85 | 21 | 11 | 5 | 3 | 1 | 1 | 7823 | 85 | 16 | 15 | 20 | 19 | 16 | 10 | 8823 |
| 20 | 64 | 32 | 16 | 8 | 4 | 2 | 1 | 5461 | 87 | 32 | 16 | 8 | 4 | 2 | 1 | 8934 | 87 | 23 | 9 | 7 | 1 | 3 | 1 | 8239 | 87 | 16 | 21 | 14 | 19 | 16 | 10 | 9179 |
| 19 | 64 | 32 | 16 | 8 | 4 | 2 | 1 | 5461 | 89 | 32 | 16 | 8 | 4 | 2 | 1 | 9286 | 89 | 25 | 7 | 9 | 1 | 3 | 1 | 8687 | 89 | 22 | 15 | 14 | 19 | 16 | 10 | 9543 |
| 18 | 64 | 32 | 16 | 8 | 4 | 2 | 1 | 5461 | 91 | 32 | 16 | 8 | 4 | 2 | 1 | 9646 | 91 | 27 | 5 | 11 | 3 | 1 | 1 | 9167 | 91 | 15 | 22 | 21 | 12 | 16 | 10 | 9931 |
| 17 | 64 | 32 | 16 | 8 | 4 | 2 | 1 | 5461 | 93 | 32 | 16 | 8 | 4 | 2 | 1 | 10014 | 93 | 29 | 3 | 13 | 5 | 1 | 1 | 9695 | 93 | 23 | 14 | 21 | 12 | 16 | 10 | 10315 |

TABLE 1.—COMPARISON OF ERROR OF 7-BIT CODES—Continued

| Level | Binary Code Error $\Delta_{i,j}$ | | | | | | | $Q_j$ | Folding binary code Error $\Delta_{i,j}$ | | | | | | | $Q_j$ | Gray code Error $\Delta_{i,j}$ | | | | | | | $Q_j$ | New code Error $\Delta_{i,j}$ | | | | | | | $Q_j$ |
|---|---|---|---|---|---|---|---|---|---|---|---|---|---|---|---|---|---|---|---|---|---|---|---|---|---|---|---|---|---|---|---|---|
| 16 | 64 | 32 | 16 | 8 | 4 | 2 | 1 | 5461 | 95 | 32 | 16 | 8 | 4 | 2 | 1 | 10390 | 95 | 31 | 1 | 15 | 7 | 3 | 1 | 10271 | 95 | 23 | 22 | 13 | 12 | 16 | 10 | 10707 |
| 15 | 64 | 32 | 16 | 8 | 4 | 2 | 1 | 5461 | 97 | 32 | 16 | 8 | 4 | 2 | 1 | 10774 | 97 | 33 | 1 | 15 | 7 | 3 | 1 | 10783 | 97 | 13 | 22 | 21 | 19 | 9 | 10 | 11045 |
| 14 | 64 | 32 | 16 | 8 | 4 | 2 | 1 | 5461 | 99 | 32 | 16 | 8 | 4 | 2 | 1 | 11116 | 99 | 35 | 3 | 13 | 5 | 1 | 1 | 11231 | 99 | 23 | 12 | 21 | 19 | 9 | 10 | 11707 |
| 13 | 64 | 32 | 16 | 8 | 4 | 2 | 1 | 5461 | 101 | 32 | 16 | 8 | 4 | 2 | 1 | 11566 | 101 | 37 | 5 | 11 | 3 | 1 | 1 | 11727 | 101 | 23 | 22 | 11 | 19 | 9 | 10 | 11877 |
| 12 | 64 | 32 | 16 | 8 | 4 | 2 | 1 | 5461 | 103 | 32 | 16 | 8 | 4 | 2 | 1 | 11974 | 103 | 39 | 7 | 9 | 1 | 3 | 1 | 12271 | 103 | 22 | 21 | 20 | 10 | 9 | 10 | 12215 |
| 11 | 64 | 32 | 16 | 8 | 4 | 2 | 1 | 5461 | 105 | 32 | 16 | 8 | 4 | 2 | 1 | 12390 | 105 | 41 | 9 | 7 | 1 | 3 | 1 | 12847 | 105 | 10 | 20 | 19 | 17 | 14 | 5 | 12396 |
| 10 | 64 | 32 | 16 | 8 | 4 | 2 | 1 | 5461 | 107 | 32 | 16 | 8 | 4 | 2 | 1 | 12805 | 107 | 43 | 11 | 5 | 3 | 1 | 1 | 13455 | 107 | 21 | 9 | 19 | 17 | 14 | 5 | 12842 |
| 9 | 64 | 32 | 16 | 8 | 4 | 2 | 1 | 5461 | 109 | 32 | 16 | 8 | 4 | 2 | 1 | 13246 | 109 | 45 | 13 | 3 | 5 | 1 | 1 | 14111 | 109 | 21 | 20 | 8 | 17 | 14 | 5 | 13296 |
| 8 | 64 | 32 | 16 | 8 | 4 | 2 | 1 | 5461 | 111 | 32 | 16 | 8 | 4 | 2 | 1 | 13686 | 111 | 47 | 15 | 1 | 7 | 3 | 1 | 14815 | 111 | 20 | 19 | 18 | 7 | 14 | 5 | 13676 |
| 7 | 64 | 32 | 16 | 8 | 4 | 2 | 1 | 5461 | 113 | 32 | 16 | 8 | 4 | 2 | 1 | 14134 | 113 | 49 | 15 | 1 | 7 | 3 | 1 | 15456 | 113 | 18 | 17 | 16 | 15 | 6 | 5 | 13924 |
| 6 | 64 | 32 | 16 | 8 | 4 | 2 | 1 | 5461 | 115 | 32 | 16 | 8 | 4 | 2 | 1 | 14590 | 115 | 51 | 13 | 3 | 5 | 1 | 1 | 16031 | 115 | 6 | 15 | 14 | 12 | 9 | 5 | 13932 |
| 5 | 64 | 32 | 16 | 8 | 4 | 2 | 1 | 5461 | 117 | 32 | 16 | 8 | 4 | 2 | 1 | 15054 | 117 | 53 | 11 | 5 | 3 | 1 | 1 | 16655 | 117 | 16 | 5 | 14 | 12 | 9 | 5 | 14416 |
| 4 | 64 | 32 | 16 | 8 | 4 | 2 | 1 | 5461 | 119 | 32 | 16 | 8 | 4 | 2 | 1 | 15526 | 119 | 55 | 9 | 7 | 1 | 3 | 1 | 17327 | 119 | 16 | 15 | 4 | 12 | 9 | 5 | 14908 |
| 3 | 64 | 32 | 16 | 8 | 4 | 2 | 1 | 5461 | 121 | 32 | 16 | 8 | 4 | 2 | 1 | 16006 | 121 | 57 | 7 | 9 | 1 | 3 | 1 | 18030 | 121 | 15 | 14 | 13 | 3 | 9 | 5 | 15346 |
| 2 | 64 | 32 | 16 | 8 | 4 | 2 | 1 | 5461 | 123 | 32 | 16 | 8 | 4 | 2 | 1 | 16494 | 123 | 59 | 5 | 11 | 3 | 1 | 1 | 18767 | 123 | 13 | 12 | 11 | 10 | 2 | 5 | 15692 |
| 1 | 64 | 32 | 16 | 8 | 4 | 2 | 1 | 5461 | 125 | 32 | 16 | 8 | 4 | 2 | 1 | 16990 | 125 | 61 | 3 | 13 | 5 | 1 | 1 | 19551 | 125 | 10 | 9 | 8 | 7 | 6 | 1 | 15956 |
| 0 | 64 | 32 | 16 | 8 | 4 | 2 | 1 | 5461 | 127 | 32 | 16 | 8 | 4 | 2 | 1 | 17494 | 127 | 63 | 1 | 15 | 7 | 3 | 1 | 20372 | 127 | 6 | 5 | 4 | 3 | 2 | 1 | 16220 |

NOTE.—Levels 64, 65, . . . , 127 have the same $\Delta_{i,j,s}$ as levels 63, 62, . . . , 0, respectively.

Table 2 gives the measure of noise in the code, $Q_c$, for the binary, folding and NNR codes.

$$Q_c = \frac{\sum_{j=0}^{127} e^{5\left(\frac{2j+1}{128}-1\right)} Q_j}{\sum_{j=0}^{63} e^{5\left(\frac{2j+1}{128}-1\right)} + \sum_{j=64}^{127} e^{-5\left(\frac{2j+1}{128}-1\right)}}$$

TABLE 2.

Average Noise with Different Codes

| Code | $Q_c$ |
|---|---|
| Binary Code | 5461 |
| Folding code | 2523 |
| NNR Code | 2307 |

As may be seen from the fore-going, the folding code is noticeably superior at the low levels when the middle words are being used, for here the number of voltage levels jumped, if an error is made in the first bit, is much less than the 64 levels jumped if the binary code were used.

The NNR code is given in Table 3 and was designed using the knowledge that errors occuring in the middle (low talking) levels are of prime concern and that their effect ($Q_j$'s) should be minimized. In other words, an effort was made to minimize the $\Delta_{ij}$'s (voltage levels jumped or volume of snaps heard) if an error occurred in one of the bits of the middle (most often used) words.

TABLE 3

The New Code

| Level | Code Word | Level | Code Word |
|---|---|---|---|
| 63 | 0000000 | 31 | 0001110 |
| 62 | 0000001 | 30 | 0010110 |
| 61 | 0000010 | 29 | 0100110 |
| 60 | 0000100 | 28 | 0011010 |
| 59 | 0001000 | 27 | 0101010 |
| 58 | 0010000 | 26 | 0110010 |
| 57 | 0100000 | 25 | 0011100 |
| 56 | 0000011 | 24 | 0101100 |
| 55 | 0000101 | 23 | 0110100 |
| 54 | 0001001 | 22 | 0111000 |
| 53 | 0010001 | 21 | 0001111 |
| 52 | 0100001 | 20 | 0010111 |
| 51 | 0000110 | 19 | 0100111 |
| 50 | 0001010 | 18 | 0011011 |
| 49 | 0010010 | 17 | 0101011 |
| 48 | 0100010 | 16 | 0110011 |
| 47 | 0001100 | 15 | 0011101 |
| 46 | 0010100 | 14 | 0101101 |
| 45 | 0100100 | 13 | 0110101 |
| 44 | 0011000 | 12 | 0111001 |
| 43 | 0101000 | 11 | 0011110 |
| 42 | 0110000 | 10 | 0101110 |
| 41 | 0000111 | 9 | 0110110 |
| 40 | 0001011 | 8 | 0111010 |
| 39 | 0010011 | 7 | 0111100 |
| 38 | 0100011 | 6 | 0011111 |
| 37 | 0001101 | 5 | 0101111 |
| 36 | 0010101 | 4 | 0110111 |
| 35 | 0100101 | 3 | 0111011 |
| 34 | 0011001 | 2 | 0111101 |
| 33 | 0101001 | 1 | 0111110 |
| 32 | 0110001 | 0 | 0111111 |

Note: For levels 64, 65, ..., 127, the code words are the same as for levels 63, 62, ..., 0, respectively, but with the first bit complemented.

The problem in designing the NNR code is one of distance, of how far away (in voltage levels or in code words assigned to voltage levels) is a given word from the word resulting from an error in one of the bits. Each word, in a seven-bit code word, has seven nearest neighbors, defined as those words that result if an error is made in one of the seven possible digits. For instance, the nearest neighbors to the code word 0000000 are 0000001, 0000010, 0000100, 0001000, 0010000, 0100000, and 1000000. The rough idea, then, of designing a code for digitized voice communication is to assign these words to voltage levels as close as possible to each other, especially if these words are in the middle of the code.

A map may be used to take some advantage of the topology of the problem because it allows one to see immediately the nearest neighbor of each code word. FIG. 3*a* shows a map of the entire code, and FIG. 3*b* shows a partially completed map to help explain how the code is generated.

For a seven-bit code (128 code words), the map has 128 squares, which are words given by the labeling on the margins and below the blocks of 16 squares. The digits at the bottom of each block of 16 squares give the first three bits; the fourth and fifth bits are given by the two digits on the left-hand margin, and the last two bits are given by the two digits on the top margin. The numbers in the squares are the voltage levels assigned to the corresponding code words. In this specific example, the middle two levels are the 63rd and 64th levels.

The rules for generating the NNR code, then, are as follows:

1. Note that probability density function of the code words is symmetric about the middle. Therefore, $Q_j$ should be symmetric about the middle, and the top and bottom half of the code should be generated "in parallel" that is, at the same time, so that the $\Delta_{ij}$'s of the 63rd word are the same as those of the 64th word, the $\Delta_{ij}$'s of the 62nd the same as those of the 65th, and so forth.

2. Start by arbitrarily assigning the 63rd level to the word 0000000 and the 64th level to the nearest neighbor of 0000000, say the word 1000000.

3. Assign the level that is nearest to the 63rd level but still not assigned to a word, that is, the 62nd level to a word that is a nearest neighbor to 0000000, that is, say, 0000001. At the same time, assign the yet unassigned level that is nearest to the 64th level, that is, the 65th level, to a word which is a nearest neighbor to 10000000, say to 1000001.

4. Continue assigning the remaining levels nearest to the 63rd and 64th levels to the remaining nearest neighbors to 00000000 and 1000000, that is, the 61st level to 0000010 and the 66th level to 100010; . . . ; and the 57th level to 0100000 and the 70th level to 1100000.

5. Look at the word assigned to the 62nd level (and the word assigned to the 65th level) and note its nearest neighbors. Assign to one of the yet unassigned nearest neighbors (0000000 is already assigned by the 63rd level and 1000001 is already assigned by the 65th level), the nearest unassigned level to the 62nd, that is, the 56th level. Thus, assign the 56th level to 0000011 (and similarly, the 71st level to 1000011), the 55th level to 0000101, and so fourth, until there are no more remaining nearest neighbors to the words assigned to levels 62 and 65.

6. Continue, next looking at the word assigned to the 61st level, finding its yet unassigned nearest neighbors, and assigning these nearest neighbors to the yet unassigned levels nearest to the 61st level, always assuring that levels assigned to nearest neighbors are as close as possible to each other, with the middle levels having highest priority (being assigned to words first).

7. Stop when all the levels have been assigned a word (that is, when the 0th and 127th levels have been assigned.)

For example, in FIG. 3*b* the word assigned to level 59 has two nearest neighbors that are not yet assigned to words, 0011000 and 0101000,marked by "X." The next level nearest to level 59 that is not yet assigned a word is level 44. The word 0011000 is also a nearest neighbor to the word assigned to level 58, while 0101000 is a nearest neighbor to the word assigned to level 57. Level 58 is nearer the middle so word 0011000 should be assigned to level 44, and word 0101000 to level 43. Thus, two of the $\Delta_{i,58}$'s are $58-44=14$ and $58-43=15$.

It is important to note that the foregoing method of generating the NNR code can be readily extended to, for example, an eight-bit code in a straightforward manner. This would result in an improvement over the other known codes in the lower talking levels over that of the seven-bit codes. For example, the maximum $\Delta_{ij}$ for the two middle words would be 7 in the NNR code as compared with 128 for the binary code and 64 for the folded code.

To better illustrate how the NNR code can be generated for code words of any arbitrary number of bits, assume that the speech samples are re quantized into $2^N$ levels. Each level is assigned with a block of N-bits. The coding procedure involves the construction of polynomials over the binary field as follows:

1. Assign the "zero" polynomial to the $(2^{N-1}-1)$ th level.

2. Assign the polynomials 1, X, $X^2$ . . . $X^{N-2}$ successively and respectively to the levels $(2^{N-1}-2)$, $(2^{N-1}-3)$, . . . $(2^{N-1}-N)$.

3. For $i=0$, step 1, until $i=N-2$ do the following:

a. Construct new polynomials by adding the polynomial $X^i$ successively to the polynomials in 2;

b. throw away the resultant polynomials that have already appeared; and c. assign the newly generated polynomials successively and respectively to the highest available level lower than $(2^{N-1}-N)$. Once a level is assigned with a polynomial, this level can no longer be a candidate for future assignments.

4. Let $3_{new}$ be the statement identical with 3 above with the exception that 2 in part *a*) of 3 is replaced by 3. If the level 0 has not been assigned yet, then a. execute the statement $3_{new}$, b. substitute $3_{new}$ just executed for 3 in the statement $3_{new}$, and c. go to (a) until level 0 is assigned, otherwise to 5.

5. Assign levels $2^{N-1}$, $(2^{N-1}+1)$ . . . $(2^{N-1})$ successively and respectively with polynomials corresponding to levels $(2^{N-1a}-1)$, $(2^{N-1}-2)$ . . . 0, added by the polynomial $X^{N-1}$.

Because it is desirable to facilitate the interface between existing PCM communication equipments, the invention is preferably practiced by converting the natural binary output of conventional PCM encoders to a folded binary code and then to the NNR code. The encoders to be described hereinafter convert the natural binary code word to its folded binary equivalent code word, and through further encoding procedures, yield the ultimate NNR code word. These stages of encoding may be explained in more depth in the following description:

1. Conversion of straight binary code word to a folded binary code:

RULE: If the most significant digit is a 1, the code word is acceptable as it is. If the most significant digit is a 0, the proper code word consists of the complements of all digits except the most significant digit.

EXAMPLE: 01101 → 00010
11101 → 11101

2. Conversion of folded binary code words to NNR code equivalents:

RULE: Using Table 4, find the decimal equivalent of the code word. The most significant digit of the NNR code word is the same as the most significant digit of the folded binary code word (or the natural binary code word). The remaining six bits of the NNR code word are on the same line as the decimal equivalent. If the decimal equivalent is complemented, then the six-bit suffix is similarly complemented.

EXAMPLE: Code word 29 is 0011101 in natural binary form (most significant digit equals 0) and 0100010 in folded binary form (most significant digit still is 0). Therefore, the most significant digits of the seven-bit NNR code word is also "0". Looking up 29 in Table 4 indicates the last six bits of the NNR code word is 100110. The complete NNR code word 29 is then 0100110.

EXAMPLE: Code word 93 is 1011101 in natural binary form and is 1011101 in folded binary form. The most significant digit is 1. Table 4 indicates the complement of the last six bits of the NNR code word, that is, 93, is 100110. The NNR code word for 93 is then 1011001.

TABLE 4

| Decimal Digit | | | | 6-bit NNR "Suffix" | | |
|---|---|---|---|---|---|---|
| 31 | $\overline{32}$ | $\overline{95}$ | 96 | 0 0 | 1 1 | 1 0 |
| 30 | $\overline{33}$ | $\overline{94}$ | 97 | 0 1 | 0 1 | 1 0 |
| 29 | $\overline{34}$ | $\overline{93}$ | 98 | 1 0 | 0 1 | 1 0 |
| 28 | $\overline{35}$ | $\overline{92}$ | 99 | 0 1 | 1 0 | 1 0 |
| 27 | $\overline{36}$ | $\overline{91}$ | 100 | 1 0 | 1 0 | 1 0 |
| 26 | $\overline{37}$ | $\overline{90}$ | 101 | 1 1 | 0 0 | 1 0 |
| 25 | $\overline{38}$ | $\overline{89}$ | 102 | 0 1 | 1 1 | 0 0 |
| 24 | $\overline{39}$ | $\overline{88}$ | 103 | 1 0 | 1 1 | 0 0 |
| 23 | $\overline{40}$ | $\overline{87}$ | 104 | 1 1 | 0 1 | 0 0 |
| 22 | $\overline{41}$ | $\overline{86}$ | 105 | 1 1 | 1 0 | 0 0 |
| 21 | $\overline{42}$ | $\overline{85}$ | 106 | 0 0 | 1 1 | 1 1 |
| 20 | $\overline{43}$ | $\overline{84}$ | 107 | 0 1 | 0 1 | 1 1 |
| 19 | $\overline{44}$ | $\overline{83}$ | 108 | 1 0 | 0 1 | 1 1 |
| 18 | $\overline{45}$ | $\overline{82}$ | 109 | 0 1 | 1 0 | 1 1 |
| 17 | $\overline{46}$ | $\overline{81}$ | 110 | 1 0 | 1 0 | 1 1 |
| 16 | $\overline{47}$ | $\overline{80}$ | 111 | 1 1 | 00 | 11 |
| 15 | $\overline{48}$ | $\overline{79}$ | 112 | 0 1 | 1 1 | 0 1 |
| 14 | $\overline{49}$ | $\overline{78}$ | 113 | 1 0 | 1 1 | 0 1 |
| 13 | $\overline{50}$ | $\overline{77}$ | 114 | 1 1 | 0 1 | 0 1 |
| 12 | $\overline{51}$ | $\overline{76}$ | 115 | 1 1 | 1 0 | 0 1 |
| 11 | $\overline{52}$ | $\overline{75}$ | 116 | 0 1 | 1 1 | 1 0 |
| 10 | $\overline{53}$ | $\overline{74}$ | 117 | 0 | 1 1 | 10 |
| 9 | $\overline{54}$ | $\overline{73}$ | 118 | 1 1 | 0 1 | 1 0 |
| 8 | $\overline{55}$ | $\overline{72}$ | 119 | 1 1 | 1 0 | 1 0 |
| 7 | $\overline{56}$ | $\overline{71}$ | 120 | 1 1 | 1 1 | 0 0 |
| 6 | $\overline{57}$ | $\overline{70}$ | 121 | 0 1 | 1 1 | 1 1 |
| 5 | $\overline{58}$ | $\overline{69}$ | 122 | 1 0 | 1 1 | 1 1 |
| 4 | $\overline{59}$ | $\overline{68}$ | 123 | 1 1 | 0 1 | 1 1 |
| 3 | $\overline{60}$ | $\overline{67}$ | 124 | 1 1 | 1 0 | 1 1 |
| 2 | $\overline{61}$ | $\overline{66}$ | 125 | 1 1 | 1 1 | 0 1 |
| 1 | $\overline{62}$ | $\overline{65}$ | 126 | 1 1 | 1 1 | 1 0 |
| 0 | $\overline{63}$ | 64 | 127 | 1 1 | 1 1 | 1 1 |

No. 2
MSD1 00 1
No. 1
MSD01

The conversion from folded binary to NNR code is based on two obvious points: (1) the code word symmetries, and (2) the lack of an obvious relationship between the binary codes and the NNR code. For the seven-bit PCM code words under study, the symmetry with respect to folded binary codes reduces the problem of decoding one seven-bit word into one of 128 possible combinations and then re-encoding each of these possible combinations into its unique NNR code word for transmission to a five-bit (32 combinations) problem.

FIG. 4 illustrates a simplified block diagram of a PCM communications system according to the invention. A conventional PCM encoder 11 receives an input voice signal and provides an output binary encoded signal in a manner well known in the art. This output binary encoded signal is provided at the input of a binary to NNR code converter 12. Such a code converter will be later described with reference to FIGS. 5 and 6. In operation, code converter 12 receives the binary encoded words from PCM encoder 11 and generates the unique NNR code words having the characteristics previously described. The output of code converter 12 is connected to a suitable transmitter 13 of any well known type and serves to modulate the carrier signal which is radiated by antenna 14. The signal radiated by antenna 14 is received by receiving antenna 15 which is connected to the input of a suitable receiver 16 of any well known type. The output of receiver 16 is connected to the input of a NNR to binary code converter 17. The converter 17 may be of the type which will be described with reference to FIG. 8. The output of code converter 17 is a binary encoded signal which is connected to the input of a conventional PCM decoder 18. Decoder 18 provides an output corresponding to the message signal samples as is well known in the art.

Referring to FIG. 5 of the drawings, there is illustrated a parallel, 2-stage encoder. The seven-bit code word in natural binary, $N_i$ (where $i = 1, 2 \ldots 7$ and $N_i$ is the most significant digit), is connected to respective ones of input terminals 11 through 17 in parallel by a shift register, for example, not shown. The input at terminal 11 is connected directly to the output terminal 18 and also as an enabling input to each of AND gates 19 through 24. The input at terminal 11 is inverted by an inverter 25, the output of which is connected as an enabling input to each of AND gates 26 through 31. The input at terminal 12 is connected directly to the second input of AND gate 19 and through inverter 32 to the second input of AND gate 26. In a similar manner, the input terminal 13 is connected directly to AND gate 20 and through inverter 33 to AND gate 27. The remaining terminals 14 through 17 are connected in an identical manner directly to AND gates 21 through 24 and through inverters 34 through 37 to AND gates 28 through 31. OR gate 32 combines the outputs of AND gates 19 and 26, and in like manner OR gates 33 through 37 combine the outputs of AND gates 20–27, 21–28, 22–29, 23–30, and 24–31. The folded binary code word is thus derived as $F_i$ at terminals 38 through 44 by the logic thus far described which, if $N_i$ is a 0, complements the remaining $N_i$ to yield the correct $F_i$.

To convert the folded binary code word to the NNR code word equivalent, signals $F_3$ through $F_7$ are decoded such that one, and only one, of the 32 output lines of the five-bit 32 output decoder 45 is activated to become a 1. The five-bit 32 output decoder 45 may be, for example, a 5 by 32 diode matrix constructed in a well known manner. The output signal from one of the 32 lines of decoder 45 then enables an associated one of 32 six-bit "suffix" stores 46, 47, or 48 to be transferred by respective transfer gates 49, 50, or 51 to six 32-input OR gates 52 through 57, one gate per $i$th position; the single output line of each gate representing, in parallel, the NNR six-bit suffix for the given last five bits of the folded binary code word. While only three six-bit stores 46, 47, and 48 and three transfer gates 49, 50, and 51 have been illustrated, it is to be expressly understood that there are 32 such stores and associated transfer gates, one for each of the 32 output lines of decoder 45. The stores 46–48 are permanent, read-only stores of any suitable type with their initial inputs provided by presetting, wiring, etc.

The outputs of the six 32-input OR gates are connected to complementing circuitry similar to that described above. Thus, for example, the output of OR gate 52 is connected directly to one input of AND gate 58 and through inverter 59 to one input of AND gate 60. In a similar manner, OR gate 53 is connected directly to one input of AND gate 61 and through inverter 62 to one input of AND gate 63. The remaining connections of OR gates 54 through 57 are identical. The output from intermediate terminal 39 is connected directly to AND gates 58, 61, 64, 67, 70, 73 and through inverter 76 to AND gates 60 63, 66, 69, 72, 75. OR gates 76 through 81 combine the outputs of AND gates 58–60, 61–63, 64–66, 67–69, 70–72, and 73–75. Thus, the folded binary bit $F_2$ either complements or leaves intact the six-bit suffix. The most significant digit of the natural binary and folded binary codes always equals the most significant digit of the NNR code and appears at output terminal 18. The remaining six bits of the NNR code appear at terminals 82 through 87.

A serial encoder is illustrated in FIG. 6, and the associated timing diagram is illustrated in FIG. 7. A START signal is required to discriminate to the equipment which bit position is the most significant digit. This START signal appears at input terminal 101. The clock signal (TMG) at input terminal 102 is gated with the START signal in AND gate 103. This inserts the complement of the most significant digit appearing at input terminal 104 into flip-flop 105. This is accomplished by gating the output of AND gate 103 with the data appearing at terminal 104 in AND gate 106. The output of AND gate 103 is shown at 1, and the output of flip-flop 105 is shown at 2 in the timing diagram of FIG. 7.

Should the most significant digit be a 0, flip-flop 105 is set and provides a 1 output to exclusive OR gate 107. This operates to complement the remaining six bits of the incoming binary code word. Thus, if the succeeding bits in the code word are 1's, the exclusive OR gate 107 will provide a 0 output, otherwise the output of the exclusive OR gate is a 1. The output of exclusive OR gate is passed by AND gate 108 to an OR gate 109. The output of AND gate 108 is shown at 4 in FIG. 7. OR gate 109 receives as its second input the output of AND gate 110. AND gate 110 receives as its input the START input from terminal 101 and the complementary output of flip-flop 105. Thus, the output of AND gate 110 shown at 3 in FIG. 7 is the most significant digit of the data word appearing at terminal 104. OR gate 109 serves the function of multiplexing together the most significant digit and the remaining six bits to yield the "F" bit stream of the folded binary code.

If the most significant digit is a 1, then it will be recalled that the binary data word is all right as is. The most significant digit is gated in AND gate 106 with the output of AND gate 103 to reset flip-flop 105 thereby presenting a 0 input to exclusive OR gate 107. Thus, the remaining bits of the data word are passed unchanged by exclusive OR gate 107 to AND gate 108 and then to OR gate 109. If, on the contrary, the most significant digit is a 0, then it is inverted by inverter 111 to be a binary 1 and gated in AND gate 112 with the output of AND gate 103 to cause flip-flop 105 to be set. This results in a 1 being applied by flip-flop 105 to exclusive OR gate 107 thereby causing the remaining six bits of the data word to be complemented as previously described. In either case, AND gate 110 acts to pass the most significant digit to OR gate 109 while AND gate 108 passes the remaining six bits of the data to OR gate 109. As mentioned, AND gate 110 is controlled by the START pulse at input terminal 101. This same pulse is inverted by inverter 113 which in turn controls AND gate 108.

In order to convert the folded binary code word to the NNR code word, the parallel approach as described primarily with respect to FIG. 5 is used. Serial-parallel and parallel-serial converters at the input and output, respectively, are therefore required. Thus, the "F" bit stream of the folded binary code is inserted into a seven-stage shift register 114. Shift register 114 is caused to shift under the control of the output of inverter 115. Inverter 115 receives as its input the clock signal at 102 and operates to shift the phase of the clock signal 180° so that the shift register shifts in between clock pulses. Each time a folded binary data word is accumulated in shift register 114, it is transferred out in parallel by transfer gates 116 under the control of the output of AND gate 103 to a storage register 117. The five least significant bits in storage register 117 are connected to a five-bit 32 output decoder 118 which is identical with decoder 45 of FIG. 5. Decoder 118 is in turn connected to a suffix generator 119 which is identical to the suffix generator shown and described in FIG. 5 and produces the last six bits of the NNR code. These last six bits of the NNR code are transferred in parallel by transfer gates 120 to a six-bit shift register 121. Transfer gates 120 operate under the control of AND gate 122. AND gate 122 receives as its input the START pulse from terminal 101 and the output of inverter 115. Thus, the output of AND gate 122 is identical to the output of AND gate 103 except that it is delayed by one-half of a clock pulse due to the 180° phase shift produced by inverter 115. The contents of shift register 121 are shifted out serially under the control of the clock signal from 102. Thus, it may be seen that the timing relationship between the transfer gates 120 and the shift pulses to the shift register 121 is maintained. The output of shift register 121 is supplied to one input of exclusive OR gate 123 which receives as its other input the second most significant digit in storage register 117. This serves to complement the output of the shift register 121 if the second most significant digit in storage register 117 is a binary 1. The most significant digit in storage register 117 is gated in AND gate 124 with the output of AND gate 122 into a one-bit shift register 125. This serves to insert the most significant bit of the NNR code before the remaining six bits which are sequentially passed by exclusive OR gate 123. The entire seven bits of the NNR code are thereafter sequentially shifted through a second one-bit shift register 126. The output of shift register 126 may then be connected to an appropriate modulator or transmitter for transmission to a receiving station.

At the receiving station, there is provided a decoder which operates to convert the received NNR code word to a folding binary code word and then a binary code word. An exemplary embodiment of such a decoder is shown in FIG. 8. The NNR code word from the receiving station is accumulated in shift register 201. It will be recalled that the most significant digit of the NRR code word is the same as the most significant digit in the corresponding folding code word and binary code word; therefore, the most significant digit position in shift register 201 contains the first bit or most significant digit of the output or decoded code word. The last six digits stored in shift register 201 must be either complemented or not depending on whether they were complemented at the transmitter station. These last six bits were complemented if the second bit of the folding code was a binary 1. It is therefore necessary to determine if the second bit of the folding code at the transmitter station had been a binary 1. This is accomplished by a counter 202 and associated logic circuitry. The counter 202 counts the number of binary 1's in the incoming code word exclusive of the most significant digit. Counter 202 provides 3 outputs: an output indicative of less than 3 binary 1's, an output indicative of 3 binary 1's, and an output indicative of greater than 3 binary 1's in the incoming code word. The output indicative of 3 binary 1's is gated in AND gate 203 with the least significant digit of shift register 201. The output of AND gate 203 is inverted by inverter 204 and combined in OR gate 205 with the output from counter 202 which is indicative of greater than 3 binary 1's. The output of AND gate 203 is combined with the output of counter 202 which is indicative of less than 3 binary 1's in OR gate 206.

The output of OR gate 205 is the second bit of the folded binary code word. This may be seen by reference to Table 4 reproduced hereinbefore which illustrates the symmetry between the folded binary code word and the NNR code word. If the output of OR gate 205 is a binary 1, then the last six bits in shift register 201 should be complemented. If on the other hand the output of OR gate 206 is a binary 1, then the last six bits in shift register 201 should not be complemented. Each of the last six stages of shift register 201 are connected to corresponding AND gate pairs 207–208, 209–210, 211–212, 213–214, 215–216, and 217–218. The output of OR gate 205 is connected to AND gates 208, 210, 212, 214, 216, and 218, while the output of OR gate 206 is connected to AND gates 207, 209, 211, 213, 215, and 217. Each of the AND gate pairs 207–208, etc. are connected to respective OR gates 219 through 224. The outputs of these OR gates 219 through 224 are connected to respective stages of a storage register 225.

Storage register 225 is connected to a decoder and suffix generator 226. The decoder and suffix generator 226 is similar to the decoder 118 and suffix generator 119 shown in FIG. 6 but differs therefrom in that decoder and suffix generator 226 receives six inputs and generates the last five bits of the code word. Thus, the decoder would be a 6 × 32 diode matrix, for example, which produces 1 output on any one of 32 lines for any given combination of six inputs. The output produced by the decoder would be used to gate the contents of one of 32 five-bit stores.

The output of decoder and suffix generator 226 is connected to one input of AND gate 227 and through an inverter 228 to an input of AND gate 229. The output of OR gate 205 after being delayed by a suitable delay device 230, is connected to AND gate 229, while the output of OR gate 206 is connected after being delayed by a suitable delay device 231 to AND gate 227. The outputs of AND gate 227 and 229 are combined in OR gate 232 with the output of delay device 230. The most significant digit stored in shift register 201 after being delayed by a suitable delay device 233 is also combined in OR gate 232.

The output of OR gate 232 is the folded binary code. It therefore only remains to convert to natural binary code. This is accomplished by storing the most significant digit in a storage device 234 which would include a flip-flop or similar device. The output of OR gate 232 is connected to one input of an exclusive OR gate 235. The other input of exclusive OR gate 235 is connected to the storage device 234. Thus, if the most significant digit of the folded binary code is a binary 0, then the remaining six bits will be complemented since the storage device 234 will provide a binary 1 to the input of the exclusive OR gate 235. If, on the other hand, the most significant digit of the folded binary code is a binary 1, the remaining six bits of the folded binary code will be passed without change. The output of the storage device 234 is multiplexed with the output of the exclusive OR gate 235 in OR gate 236 to yield the resulting binary code word.

Figure 9:
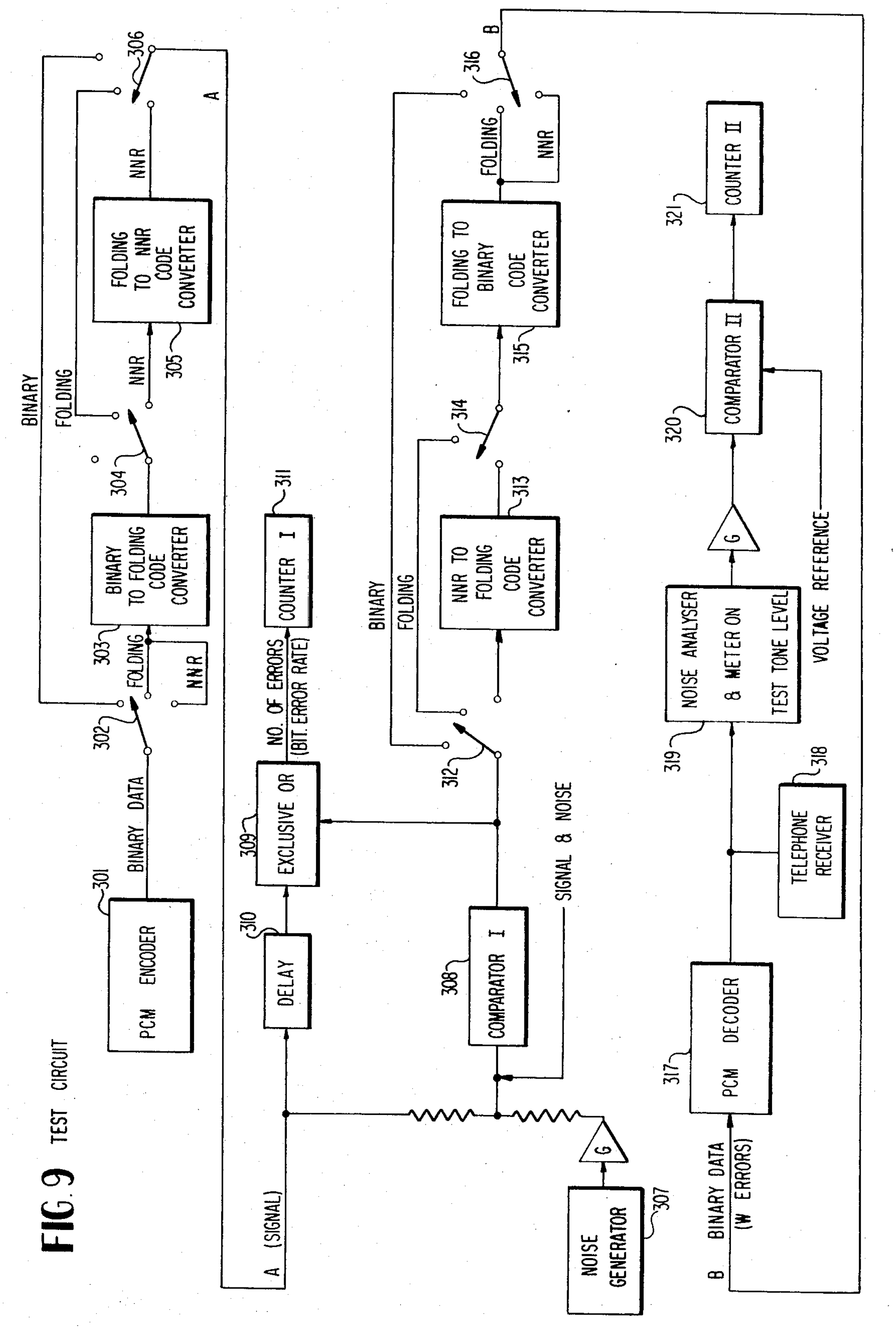
FIG. 9 is a block diagram of a test circuit used for comparative subjective tests of binary codes and the NNR code in PCM-encoded voice communications systems.
Figures 10A, 10B:
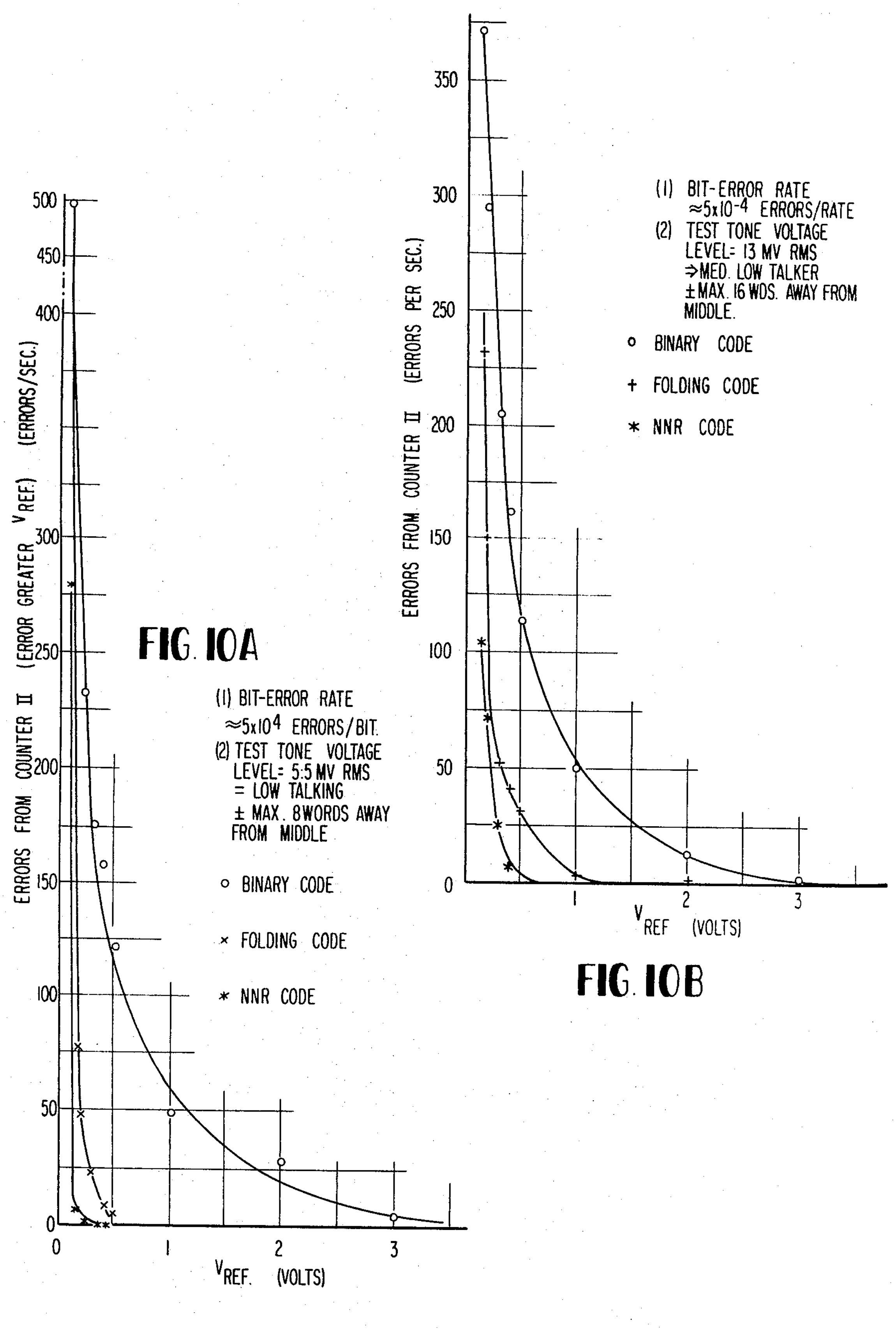
FIGS. 10*a*, 10*b*, 10*c*, and 10*d* are graphs illustrating some of the quantitative results of the tests using the different codes with the test circuit of FIG. 8.
Figures 10C, 10D:
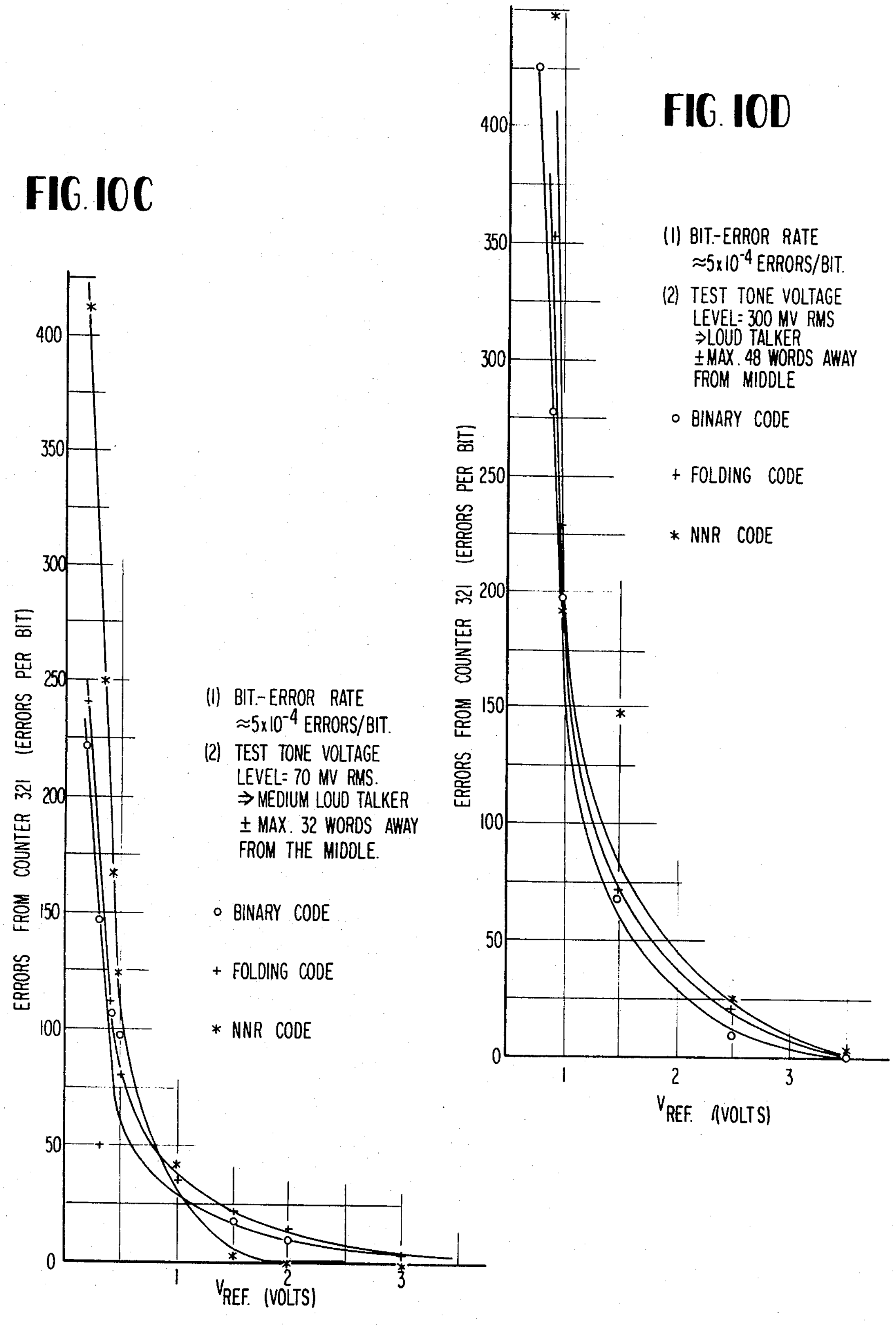

FIG. 9 illustrates a block diagram of a test circuit that has been used to test the subjective effects of noise in the NNR code in comparison to the same noise generated in the binary and folded binary codes. A conventional PCM encoder 301 was used to provide binary output data from an input voice signal. The output from the PCM encoder 301 is connected to the movable contact of switch 302. The middle and lowermost fixed contacts of switch 302 are connected to the input of a binary to folded binary code converter 303. The output of converter 303 is in turn connected to the movable contacts of a second switch 304. The lowermost fixed contact of switch 304 is connected to a folded to NNR code converter 305, the output of which is connected to the lowermost fixed contact of switch 306. The middle contacts of switches 304 and 306 are connected together, and the uppermost fixed contacts of switches 302 and 306 are connected together. Switches 302, 304, and 306 are mechanically ganged together so that by appropriate positioning of the movable contacts thereof, there is available at the output of switch 306 either binary, folded binary, or NNR codes.

Errors are introduced by adding Gaussian noise produced by noise generator 307 into the bit stream of the data. A comparator 308 then makes a decision as to whether a binary 1 or a binary 0 was sent. The output of comparator 308 is connected to one input of exclusive OR gate 309. The other input of exclusive OR gate 309 receives the output of switch 306 after it has been delayed by an appropriate delay device 310. The output of exclusive OR gate 309 is thus the bit error rate of the bit stream after noise has been introduced into it. This bit-error rate is counted by a counter 311.

The output of comparator 308 is also connected to a switch and decoding network comprising switches 312, 314, and 316 and NNR to folded binary code converter 313 and folded binary to binary code converter 315. Switches 312, 314, and 316 are mechanically ganged with switches 302, 304, and 306. The output of switch 316 is therefore binary data with errors. This output is connected to a conventional PCM decoder 317 which provides a voice output to telephone receiver 318. The output of PCM decoder 317 is also connected to a noise analyzer 319. The output of noise analyzer 319 is connected to a second comparator 320 whose output is connected to a second counter 321. The comparator 320 receives a reference voltage and produces an output pulse each time the output of noise analyzer 319 exceeds the reference voltage.

In making the test, the output of the PCM decoder 317, which is either a voice or a test tone signal plus noise of different amplitude levels, depending on which code is used, is either listened to at telephone receiver 318 or sent through the noise analyzer 319, comparator 320 and counter 321 in order to measure the amplitude and number of the voltage level errors. These voltage level errors sound as snaps or soft clicks, depending on how large they are. The test circuit shown in FIG. 9 therefore roughly measures the $\Delta_{ij}$'s. It should be pointed out, however, that the output of the PCM decoder 317 would "ring" when a voltage level error occurred so that more than one error might be recorded by the counter 321 when in fact only one error in the bit stream really occurred. But such a ringing is what the ear hears, so the measurement is still valid for the subjective tests. An indication of the amplitude of the noise pulses in the output voltage level was determined by the setting of the reference voltage of the comparator 320.

Table 5 gives the relationship between the PCM output voltage level and the words used in the code.

TABLE 5

Relation between Test Tone Voltage PCM Output and the Code Words that are Used

| PCM Output (620R Load) mV RMS | Words Away From The Middle That Occur |
|---|---|
| 2.2 | ± 4 |
| 5.5 | ± 8 |
| 13.0 | ±16 |
| 70 | ±32 |
| 300 | ±48 |

FIGS. 10*a*, 10*b*, 10*c*, and 10*d* illustrate graphically the quantitative results of the tests using the three different codes. Both the quantitative results and the qualitative results of subject reactions are very close to what the theory indicated. At the very low levels (no speech) the NNR code is unquestionably superior when enough noise is present such that noticeable cracks are heard when the binary code is used (an error rate of about $1.5 \times 10^{-4}$ error per bit sent). At the normal talking levels, the subjective results indicate that the NNR code was preferred over the other two, with the folded binary code not too much worse and the binary code unquestionably much worse. Only when the talking is relatively loud, with few pauses, does the use of the NNR code begin to become as noisy as when the binary code is used. These results show that the channel bit-error rate can be increased by a factor of 5 or more if the NNR code is used with no loss in comfort to the listener. For example, a bit-error probability of about $1 \times 10^{-4}$ causes about 15 very loud snaps per minute at the output of the decoder when the binary code is used, independent of the level of talking. With the use of the NNR code and an error rate of $4 \times 10^{-4}$ errors per bit, no snaps are heard unless someone is talking and then the snaps occur no more often than when the binary code was used with a $10^{-4}$ error rate and are some what obscured by the loudness of the voice that is talking. It is important also to note that even though the error rate may be set relatively low, say at $10^{-5}$ errors per bit, the binary code still yields a loud snap just as loud as it does when the error rate is higher — even though the snaps would occur less often (about two per minute with a $10^{-5}$ error rate).

It will be apparent that the embodiments shown are only exemplary and that various modifications can be made in construction and arrangement within the scope of the invention as defined in the appended claims.

We claim:

1. In a method of converting an analog input signal into digital form including the steps of sampling the analog signal and then encoding said sampled signal by generating a code word pattern having a unique code word for each amplitude level of the sampled signal, the improvement comprising: generating a nearest neighbor rule code word pattern having a unique code word for each one of at least eight amplitude sampling levels employed which minimizes voltage levels jumped if an error occurs in one of the bits of the code words corresponding to the middle amplitude sampling levels, said nearest neighbor rule code word pattern comprising:
   1. an arbitrary pair of code words differing from each other in a single bit position being assigned to two adjacent amplitude sampling levels nearest the mid-point of the amplitude distribution curve of the sampled signal, and
   2. the code words above and below the arbitrary words differing from them, respectively, in a minimum number of bit positions of the least possible significance relative to their distances from them in terms of sampling levels.

2. In a PCM communications system, means for encoding signal samples into nearest neighbor rule (NNR) code groups from a nearest neighbor rule code word pattern having a unique code word for each one of at least eight amplitude sampling levels employed, said nearest neighbor rule code word pattern comprising:
   1. an arbitrary pair of code words differing from each other in a single bit position being assigned to two adjacent amplitude sampling levels nearest the mid-point of the amplitude distribution curve of the signal samples, and
   2. the code words above and below the arbitrary words differing from them, respectively, in a minimum number of bit positions of the least possible significance relative to their distances from them in terms of sampling levels, means for transmitting the code groups to a receiver station, and means at said receiver station for decoding the code groups into message signal samples.

3. The PCM communications system as recited in claim 2 wherein said means for encoding signal samples comprises:
   a. means for encoding said signal samples into natural binary code,
   b. means for converting the resulting natural binary code to a folded binary code, and
   c. means for converting the folded binary code to the NNR code.

4. The PCM communications system as recited in claim 2 wherein said means for encoding signal samples comprises:
   a. means for encoding said signal samples into natural binary code,
   b. means for detecting the value of the most significant bit of the natural binary code,
   c. means responsive to said means for detecting for complementing all the remaining bits of the natural binary code if the most significant bit is a binary 0 to produce a folded binary code,
   d. suffix generating means receiving the least most significant through the (N—2) most significant bits of the folded binary code, where N is the number of bits in the code, for generating a suffix of (N–1) bits, e. means for detecting the value of the second most significant bit of the folded binary code, f. means responsive to said means for detecting the second most significant bit for complementing the suffix generated by said suffix generating means if the second most significant bit of the folded binary code is a binary 0, and g. means for combining the most significant bit with the output of said suffix complementing means to produce the NNR code.

5. The PCM communications system as recited in claim 2 wherein said means for decoding the code groups comprises:

a. means for converting the NNR code groups into a folded binary code, b. means for converting the resulting folded binary code into natural binary code, and c. means for converting the natural binary code into message signal samples.

6. The PCM communications system as recited in claim 2 wherein said means for decoding the code groups comprises:

a. shift register means connected to accumulate each NNR code group, b. counting means connected to receive each NNR code group for counting the number of binary 1's in each code group exclusive of the most significant digit, c. logic means coupled to the output of said counting means and responsive to the least significant digit in said shift register means for generating a complementing signal, d. means responsive to said complementing signal for complementing all the bits in said shift register means exclusive of the most significant digit, e. suffix generating means receiving the output of said complementing means for generating a suffix of (N–2) bits where N is the number of bits in the code, f. second logic means responsive to said complementing signal for generating the second most significant bit of the folded binary code, and complementing said suffix if said second most significant bit is a binary 1, g. means responsive to said second logic means and said most significant digit of said shift register means for adding the most significant and second most digits to the output of said second logic means to produce a folded binary code, h. means for detecting the value of the most significant bit of the resulting folded binary code, and i. means responsive to said means for detecting for complementing all of the remaining bits of the folded binary code if the most significant bit is a binary 0 to produce the natural binary code.

7. In a PCM communications system, an encoder for encoding signal samples in nearest neighbor rule (NNR) code words comprising:

a. means for encoding said signal samples into natural binary code words, b. means for converting the resulting natural binary code words to folded binary code words, and c. means for converting the folded binary code words to NNR code words from a nearest neighbor rule code word pattern having a unique code word for each one of at least eight amplitude sampling levels employed, said nearest neighbor rule code word pattern comprising:

1. an arbitrary pair of code words differing from each other in a single bit position being assigned to two adjacent amplitude sampling levels nearest the mid-point of the amplitude distribution curve of the signal samples, and 2. the code words above and below the arbitrary words differing from them, respectively, in a minimum number of bit positions of the least possible significance relative to their distances from them in terms of sampling levels.

8. An encoder as recited in claim 7 wherein said means for converting a folded binary code includes:

a. means for detecting the value of the most significant bit, and b. means responsive to said means for detecting for complementing all the remaining bits of a straight binary code if the most significant bit is a binary 0.

9. An encoder as recited in claim 8 wherein said means for converting to the NNR code includes:

a. suffix generating means receiving the least most significant through the (N–2) most significant bits of the folded binary code, where N is the number of bits in the code, for generating a suffix of (N–1) bits, b. means for detecting the value of the second most significant bit of the folded binary code, c. means responsive to said means for detecting the second most significant bit for complementing the suffix generated by said suffix generating means if the second most significant bit of the folded binary code is a binary 0, and d. means for combining the most significant bit with the output of said suffix complementing means to produce the NNR code.

10. In a PCM communications system, a decoder for decoding nearest neighbor rule (NNR) words into message signal samples comprising:

a. means for converting the NNR code words into folded binary code words, the NNR code words being derived from a nearest neighbor rule code word pattern having a unique code word for each one of at least eight amplitude sampling levels employed, said nearest neighbor rule code word pattern comprising:

1. an arbitrary pair of code words differing from each other in a single bit position being assigned to two adjacent amplitude sampling levels nearest the mid-point of the amplitude distribution curve of the signal samples, and 2. the code words above and below the arbitrary words differing from them, respectively, in a minimum number of bit positions of the least possible significance relative to their distances from them in terms of sampling levels, b. means for converting the resulting folded binary code words to natural binary code words, and c. means for converting the natural binary code words to message signal samples.

11. A decoder as recited in claim 10 wherein said means for converting to the folded binary code includes:

a. shift register means for accumulating the bits of the NNR code word, b. counting means connected to receive the NNR code for counting the number of binary ones in the code word exclusive of the most significant digit, c. logic means connected to said counting means and to the least signficant digit position of said shift register means for generating a complementing signal, d. means responsive to said complementing signal for complementing all of the bits in said shift register means exclusive of the most significant digit, e. suffix generating means receiving the output of said complementing means for generating a suffix of (N–2) bits, where N is the number of bits in the code, f. second logic means responsive to said complementing signal for generating the second most significant bit of the folded binary code, and complementing said suffix if said second most significant bit is a binary 1, and g. means for combining said second most significant bit and the most significant bit in said shift register means with the output of said second logic means to produce the folded binary code.

12. A decoder as recited in claim 11 wherein said means for converting the folded binary code to the straight binary code includes:

a. means for detecting the value of the most significant bit in the folded binary code, and b. means responsive to said means for detecting for complementing all the remaining bits for the folded binary code if the most significant bit is a binary 0.

13. A method for minimizing the effects of single bit errors in a PCM voice communications systems in which the input signal has a Laplace type amplitude distribution curve, comprising the steps of:

a. amplitude sampling an analog input signal, b. generating a nearest neighbor rule code word pattern having a unique code word for each one of at least eight amplitude sampling levels employed, said nearest neighbor rule code word pattern comprising:

1. an arbitrary pair of code words differing from each other in a single bit position being assigned to two adjacent amplitude sampling levels nearest the mid-point of the distribution curve, and 2. the code words above and below the arbitrary words differing from them, respectively, in a minimum number of bit positions of the least possible significance relative to their distances from them in terms of sampling levels, and c. encoding each amplitude sample in accordance with the nearest neighbor rule code word pattern defined in subparagraph (b) above.

* * * * *